(12) United States Patent
Najibikohnehshahri et al.

(10) Patent No.: US 11,423,636 B2
(45) Date of Patent: *Aug. 23, 2022

(54) SALIENCY-BASED OBJECT COUNTING AND LOCALIZATION

(71) Applicant: eBay Inc., San Jose, CA (US)

(72) Inventors: Mahyar Najibikohnehshahri, San Jose, CA (US); Fan Yang, San Jose, CA (US); Qiaosong Wang, San Francisco, CA (US); Robinson Piramuthu, Oakland, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,201

(22) Filed: Dec. 5, 2019

(65) Prior Publication Data

US 2020/0143193 A1 May 7, 2020

Related U.S. Application Data

(63) Continuation of application No. 15/475,816, filed on Mar. 31, 2017, now Pat. No. 10,521,691.

(51) Int. Cl.
*G06V 10/46* (2022.01)
*G06T 7/194* (2017.01)
(Continued)

(52) U.S. Cl.
CPC ............. *G06V 10/462* (2022.01); *G06F 16/00* (2019.01); *G06K 9/6289* (2013.01);
(Continued)

(58) Field of Classification Search
CPC .............. G06K 9/4671; G06K 9/6289; G06K 9/00664; G06T 7/11; G06T 7/194; G06T 2207/20084; G06T 2207/30242; G06N 3/0454; G06N 3/084; G06N 5/022; G06F 16/00; G06V 10/462; G06V 20/10
See application file for complete search history.

(56) References Cited

U.S. PATENT DOCUMENTS

| 8,386,406 B2 | 2/2013 | Bolivar et al. |
| 8,798,363 B2 | 8/2014 | Bhardwaj et al. |

(Continued)

FOREIGN PATENT DOCUMENTS

| EP | 2511121 A1 | 10/2012 |
| WO | 2018/183445 A1 | 10/2018 |

OTHER PUBLICATIONS

Zhang et al. "Vision-based Vehicle Detecting and Counting for Traffic Flow Analysis." International Joint Conference on Neural Networks, Jul. 24, 2016, pp. 2267-2273 (Year: 2016).*

(Continued)

*Primary Examiner* — Jon Chang
(74) *Attorney, Agent, or Firm* — Holland & Hart LLP

(57) ABSTRACT

Methods, systems, and computer programs are presented for adding new features to a network service. An example method includes accessing an image from a user device to determine a salient object count of a plurality of objects in the image. A salient object count of the plurality of objects in the image is determined. An indicator of the salient object count of the plurality of objects in the image is caused to be displayed on the user device.

20 Claims, 18 Drawing Sheets

(51) Int. Cl.

| | | |
|---|---|---|
| *G06K 9/62* | (2022.01) | |
| *G06T 7/11* | (2017.01) | |
| *G06N 3/04* | (2006.01) | |
| *G06F 16/00* | (2019.01) | |
| *G06N 3/08* | (2006.01) | |
| *G06V 20/10* | (2022.01) | |
| *G06N 5/02* | (2006.01) | |

(52) U.S. Cl.
CPC .......... *G06N 3/0454* (2013.01); *G06N 3/084* (2013.01); *G06T 7/11* (2017.01); *G06T 7/194* (2017.01); *G06V 20/10* (2022.01); *G06N 5/022* (2013.01); *G06T 2207/20084* (2013.01); *G06T 2207/30242* (2013.01)

(56) References Cited

U.S. PATENT DOCUMENTS

| | | | |
|---|---|---|---|
| 9,454,712 | B2 | 9/2016 | Lin et al. |
| 10,521,691 | B2* | 12/2019 | Najibikohnehshahri ..................... G06K 9/6289 |
| 2003/0048950 | A1 | 3/2003 | Savakis et al. |
| 2004/0037460 | A1 | 2/2004 | Luo et al. |
| 2014/0193087 | A1 | 7/2014 | Conwell |
| 2014/0254922 | A1 | 9/2014 | Wang et al. |
| 2016/0180193 | A1 | 6/2016 | Masters et al. |
| 2018/0285682 | A1 | 10/2018 | Najibi et al. |
| 2020/0097701 | A1* | 3/2020 | Chukka ................ G06K 9/6274 |

OTHER PUBLICATIONS

Specification for U.S. Appl. No. 62/423,114 (Year: NA).*
Final Office Action received for U.S. Appl. No. 15/475,816, dated May 28, 2019, 6 pages.
First Action Interview—Pre-Interview Communication received for U.S. Appl. No. 15/475,816, dated Jul. 26, 2018, 10 pages.
First Action Interview—Office Action Summary received for U.S. Appl. No. 15/475,816 dated Dec. 10, 2018, 11 pages.
Notice Of Allowance received for U.S. Appl. No. 15/475,816, dated Aug. 27, 2019, 9 pages.
Response to Final Office Action filed on Jul. 29, 2019 for U.S. Appl. No. 15/475,816, dated May 28, 2019, 8 pages.
Response to First Action Interview—Pre-Interview Communication filed on Aug. 27, 2018, for U.S. Appl. No. 15/475,816, dated Jul. 26, 2018, 2 pages.
Response to First Action Interview Filed on Mar. 11, 2019 for U.S. Appl. No. 15/475,816 dated Dec. 10, 2018, 10 Pages.
Kapsalas, et al., "Regions Of Interest For Accurate Object Detection", Image Video and Multimedia Systems Laboratory, Department of Electrical & Computer Engineering, Jul. 2008, 8 pages.
Najibi, et al., "Towards the Success Rate of One: Real-time Unconstrained Salient Object Detection", IEEE Conference Proceedings (IEEE Conf Proc), 2017, 10 pages.
International Preliminary Report on Patentibility received for PCT Application No. PCT/US2018/024760, dated Oct. 10, 2019, 6 pages.
International Search Report received for PCT Application No. PCT/US2018/024760, dated Jun. 22, 2018, 2 pages.
Written Opinion received for PCT Patent Application No. PCT/US2018/024760, dated Jun. 22, 2018, 4 pages.

* cited by examiner $$M_g(x,y) = \sum_{i=1}^{N} e^{-\frac{1}{2}(\mathbf{v}_{xy}-\mu_i)^T \Sigma_i (\mathbf{v}_{xy}-\mu_i)} \mathbb{1}_{\mathbf{v}_{xy} \in \mathcal{R}_{B_i}} \quad (1)$$

FIG. 15

$$\Sigma_i = \begin{bmatrix} \lfloor \frac{w_i}{s} \rfloor 2/4, & 0 \\ 0, & \lfloor \frac{h_i}{s} \rfloor 2/4 \end{bmatrix} \quad (2)$$

FIG. 16

$$\ell_{sal}(\mathbf{x}, \mathbf{g}) = \frac{1}{2d} \sum_{i=1}^{d} \alpha^{\mathbb{1}_{g_i > 0.5}} (x_i - g_i)^2 \quad (3)$$

FIG. 18

$$\ell(\mathbf{x}, \mathbf{g}, y, n) = \ell_{sal}(\mathbf{x}, \mathbf{g}) + \lambda \ell_{sub}(y, n) \quad (4)$$

FIG. 19

$$\ell(\mathbf{x}, \mathbf{g}, y, n) = \mathbb{1}_{n_{box} \geq n} \ell_{sal}(\mathbf{x}, \mathbf{g}) + \lambda \ell_{sub}(y, n) \quad (5)$$

FIG. 20

SALIENCY-BASED OBJECT COUNTING AND LOCALIZATION

CROSS REFERENCE TO RELATED APPLICATIONS

This application is a continuation of and claims priority to U.S. patent application Ser. No. 15/475,816, filed Mar. 31, 2017, issued as U.S. Pat. No. 10,521,691, and entitled "Saliency-based Object Counting and Location." The contents of this prior application are considered part of this application, and are hereby incorporated by reference in their entirety.

TECHNICAL FIELD

The subject matter disclosed herein generally relates to the technical field of special-purpose machines that facilitate image processing such as saliency-based object counting and localization within a network service, including software-configured computerized variants of such special-purpose machines and improvements to such variants, and to the technologies by which such special-purpose machines become improved compared to other special-purpose machines that facilitate saliency-based object counting and localization.

BACKGROUND

Saliency detection has been studied under three different scenarios. Early works attempt to predict human eye-fixation over an image, while later works increasingly focus on salient foreground segmentation, i.e., predicting a dense, pixel-level binary map to differentiate the salient objects from the background. However, salient foreground segmentation does not provide a way to separate different overlapping salient objects. Also, salient foreground segmentation requires pixel-level annotations that are expensive to acquire for large datasets. Different from salient foreground segmentation, salient object detection aims to locate and draw bounding boxes around salient objects. Salient object detection uses bounding box annotations, which significantly reduces the effort for human labeling, and can easily separate overlapping salient objects.

With the re-emergence of the convolutional neural network (CNN), the computer vision community has witnessed numerous breakthroughs, including salient object detection, thanks to the extraordinary discriminative and representative ability of CNNs. Prior to CNNs, heuristics detected a single salient object in an image. Also, a fixed-sized list of bounding boxes which might contain salient objects was ranked without determining the exact detections. However, such methods do not solve the existence problem, i.e., determining whether any salient objects exist in an image at all, and simply rely on external binary classifiers to address this problem. Recently, saliency detection based on deep networks has achieved state-of-the-art performance. For example, one network designed for generic object detection generates hundreds of candidate bounding boxes that are further ranked to output a compact set of salient objects. A probabilistic approach filters and re-ranks candidate boxes as a substitution for non-maxima suppression (NMS). To improve accuracy, the network is applied recursively to image sub-parts, adding additional overhead.

To accurately localize salient objects, these approaches require a large number of class-agnostic proposals covering the whole image. If only tens of boxes are used, precision and recall of these methods significantly drop. Generic object proposals have a very low success rate of locating an object, i.e., only a few of all the proposals tightly enclose the ground-truth objects, while most are redundant. Despite the application of additional refinement steps, many false positives remain. Such additional steps also make this framework infeasible for real-time applications.

BRIEF DESCRIPTION OF THE DRAWINGS

Various ones of the appended drawings merely illustrate example embodiments of the present disclosure and cannot be considered as limiting its scope.

FIGS. 15-16 are equations relating to various aspects of saliency-based object counting and localization.

FIGS. 18-20 are further equations relating to various aspects of saliency-based object counting and localization.

DETAILED DESCRIPTION

An end-to-end deep network for real-time salient object detection, is RSD. Example embodiments of saliency detection find the most distinct regions from a visual scene. Saliency detection has importance in different applications such as object detection, image segmentation, image thumbnailing, video summarization, etc. Example embodiments perform unconstrained salient object detection in images using deep convolutional neural networks. Instead of generating thousands of candidate bounding boxes and refining them, in example embodiments the network directly learns to generate the saliency map containing the exact number of salient objects. During training, in example embodiments the ground-truth rectangular boxes are converted to Gaussian distributions centered at ground-truth salient objects that are more informative and discriminative than bounding boxes to distinguish multiple salient objects, and that better capture the ROI regarding individual salient objects. During inference, in example embodiments the network predicts Gaussian distributions centered at salient objects with an appropriate covariance, from which bounding boxes are inferred. Example embodiments of the network perform: saliency map prediction without pixel-level annotations, salient object detection without object proposals, and/or salient object subitizing, simultaneously within a unified framework in s single pass. Extensive experiments show that example embodiments outperform existing CNN-based methods using bounding boxes on various datasets by a large margin, and achieves more than 100 fps with VGG16 network on a single GPU during inference. Example embodiments also produce comparable results on salient foreground segmentation datasets, even without any pixel level annotations. The network of example embodiments is more suitable for real-time applications.

Generally, enabling an intelligent personal assistant system includes a scalable artificial intelligence (AI) framework, also referred to as AI architecture, that permeates the fabric of existing messaging platforms to provide an intelligent online personal assistant, referred to herein as "bot". The AI framework provides intelligent, personalized answers in predictive turns of communication between a human user and the intelligent online personal assistant.

An orchestrator component effects specific integration and interaction of components within the AI architecture. The orchestrator acts as the conductor that integrates the capabilities provided by a plurality of services. In one aspect, the orchestrator component decides which part of the AI framework to activate (e.g., for image input, activate computer vision service, and for input speech, activate speech recognition).

Figure 1:
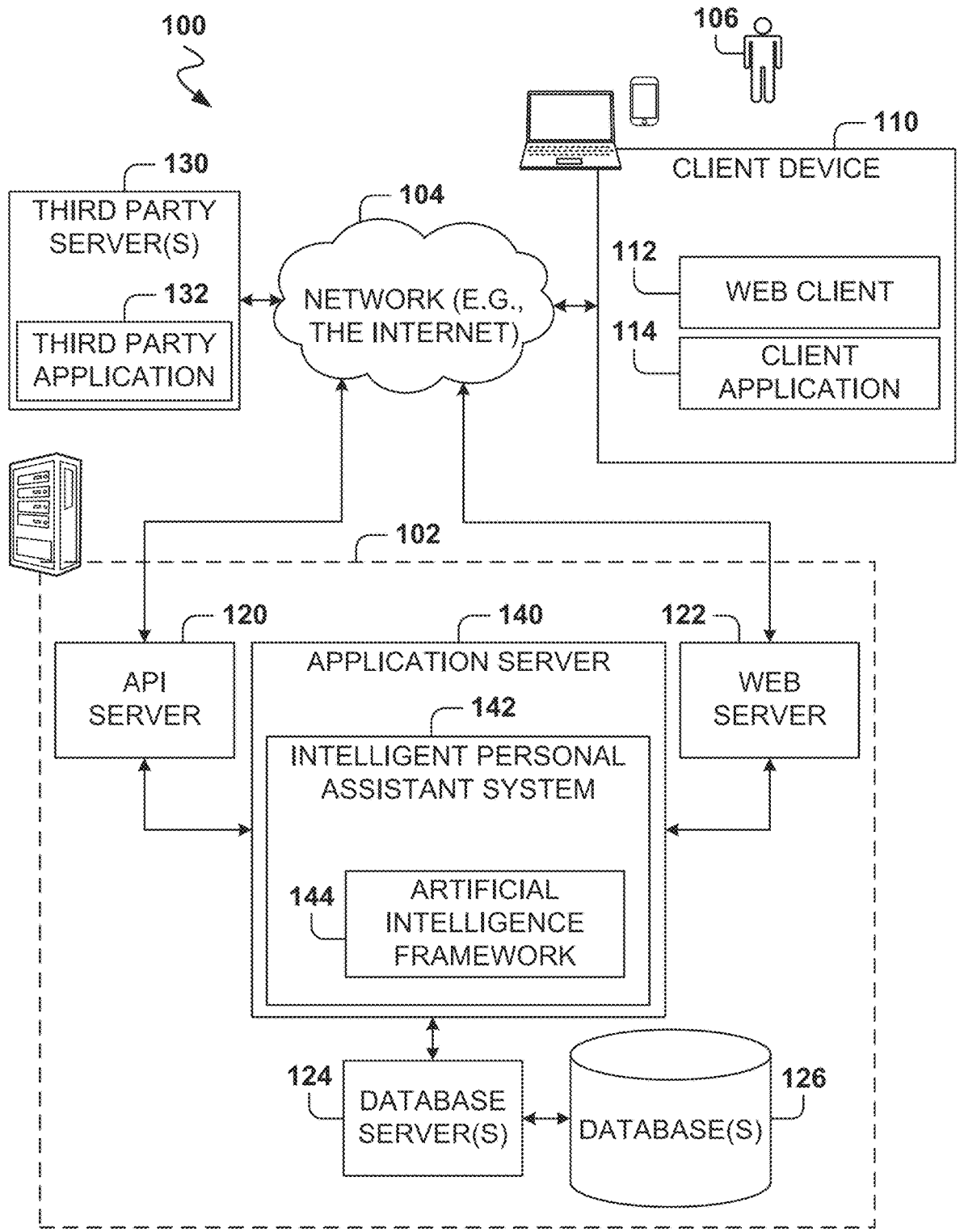
FIG. 1 is a block diagram illustrating a networked system, according to some example embodiments.

FIG. 1 is a block diagram illustrating a networked system, according to some example embodiments. With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 216 and a web server 218 are coupled to, and provide programmatic and web interfaces respectively to, one or more application servers 140. The application server 140 host the intelligent personal assistant system 142, which includes the artificial intelligence framework 144, each of which may comprise one or more modules or applications and each of which may be embodied as hardware, software, firmware, or any combination thereof.

The application server 140 is, in turn, shown to be coupled to one or more database servers 226 that facilitate access to one or more information storage repositories or databases 226. In an example embodiment, the databases 226 are storage devices that store information to be posted (e.g., publications or listings) to the publication system 242. The databases 226 may also store digital item information in accordance with example embodiments.

Additionally, a third-party application 132, executing on third-party servers 130, is shown as having programmatic access to the networked system 102 via the programmatic interface provided by the API server 216. For example, the third-party application 132, utilizing information retrieved from the networked system 102, supports one or more features or functions on a website hosted by the third party. The third-party website, for example, provides one or more promotional, marketplace, or payment functions that are supported by the relevant applications of the networked system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 102 and the artificial intelligence framework system 144 could also be implemented as standalone software programs, which do not necessarily have networking capabilities.

The web client 212 may access the intelligent personal assistant system 142 via the web interface supported by the web server 218. Similarly, the programmatic client 116 accesses the various services and functions provided by the intelligent personal assistant system 142 via the programmatic interface provided by the API server 216.

Additionally, a third-party application(s) 132, executing on a third-party server(s) 130, is shown as having programmatic access to the networked system 102 via the programmatic interface provided by the API server 114. For example, the third-party application 132, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
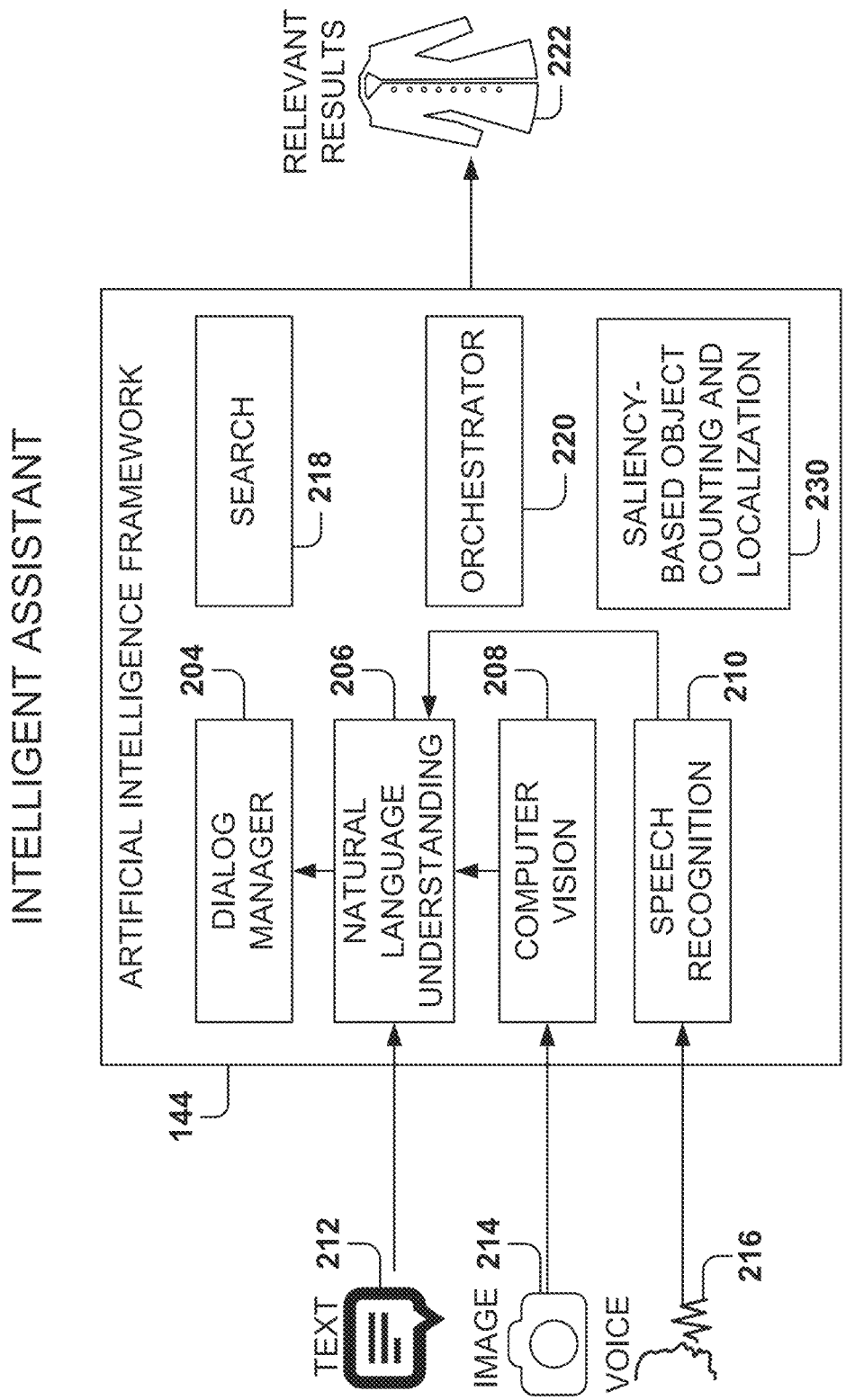
FIG. 2 is a diagram illustrating the operation of the intelligent assistant, according to some example embodiments.

FIG. 2 is a diagram illustrating the operation of the intelligent assistant, according to some example embodiments. Today's online shopping is impersonal, unidirectional, and not conversational. Buyers cannot speak in plain language to convey their wishes, making it difficult to convey intent. Shopping on a commerce site is usually more difficult than speaking with a salesperson or a friend about a product, so oftentimes buyers have trouble finding the products they want.

Embodiments present a personal shopping assistant, also referred to as an intelligent assistant, that supports a two-way communication with the shopper to build context and understand the intent of the shopper, enabling delivery of better, personalized shopping results. The intelligent assistant has a natural, human-like dialog, which helps a buyer with ease, increasing the likelihood that the buyer will reuse the intelligent assistant for future purchases.

The artificial intelligence framework 144 understands the user and the available inventory to respond to natural-language queries and has the ability to deliver an incremental improvements in anticipating and understanding the customer and their needs.

The artificial intelligence framework (AIF) 144 includes a dialogue manager 504, natural language understanding (NLU) 206, computer vision 208, speech recognition 210, search 218, orchestrator 220, and saliency-based object counting and localization. The AIF 144 is able to receive different kinds of inputs, such as text input 212, image input 214 and voice input 216, to generate relevant results 222. As used herein, the AIF 144 includes a plurality of services (e.g., NLU 206, computer vision 208) that are implemented by corresponding servers, and the terms service or server may be utilized to identify the service and the corresponding service.

The natural language understanding (NLU) 206 unit processes natural language text input 212, both formal and informal language, detects the intent of the text, and extracts useful information, such as objects of interest and their attributes. The natural language user input can thus be transformed into a structured query using rich information from additional knowledge to enrich the query even further. This information is then passed on to the dialog manager 504 through the orchestrator 220 for further actions with the user or with the other components in the overall system. The structured and enriched query is also consumed by search 218 for improved matching. The text input may be a query for a product, a refinement to a previous query, or other information to an object of relevance (e.g., shoe size).

The computer vision 208 takes image as an input and performs image recognition to identify the characteristics of the image (e.g., item the user wants to ship), which are then transferred to the NLU 206 for processing. The speech recognition 210 takes speech 216 as an input and performs language recognition to convert speech to text, which is then transferred to the NLU for processing.

The NLU 206 determines the object, the aspects associated with the object, how to create the search interface input, and how to generate the response. For example, the AIF 144 may ask questions to the user to clarify what the user is looking for. This means that the AIF 144 not only generates results, but also may create a series of interactive operations to get to the optimal, or close to optimal, results 222.

For example, in response to the query, "Can you find me a pair of red nike shoes?" the AIF 144 may generate the following parameters: <intent:shopping, statement-type: question, dominant-object:shoes, target:self, color:red, brand:nike>. To the query, "I am looking for a pair of sunglasses for my wife," the NLU may generate <intent: shopping, statement-type:statement, dominant-object:sunglasses, target:wife, target-gender:female>.

The dialogue manager 504 is the module that analyzes the query of a user to extract meaning, and determines if there is a question that needs to be asked in order to refine the query, before sending the query to search 218. The dialogue manager 504 uses the current communication in context of the previous communication between the user and the artificial intelligence framework 144. The questions are automatically generated dependent on the combination of the accumulated knowledge (e.g., provided by a knowledge graph) and what search can extract out of the inventory. The dialogue manager's job is to create a response for the user. For example, if the user says, "hello," the dialogue manager 504 generates a response, "Hi, my name is bot."

The orchestrator 220 coordinates the interactions between the other services within the artificial intelligence framework 144. More details are provided below about the interactions of the orchestrator 220 with other services with reference to FIG. 5.

Figure 3:
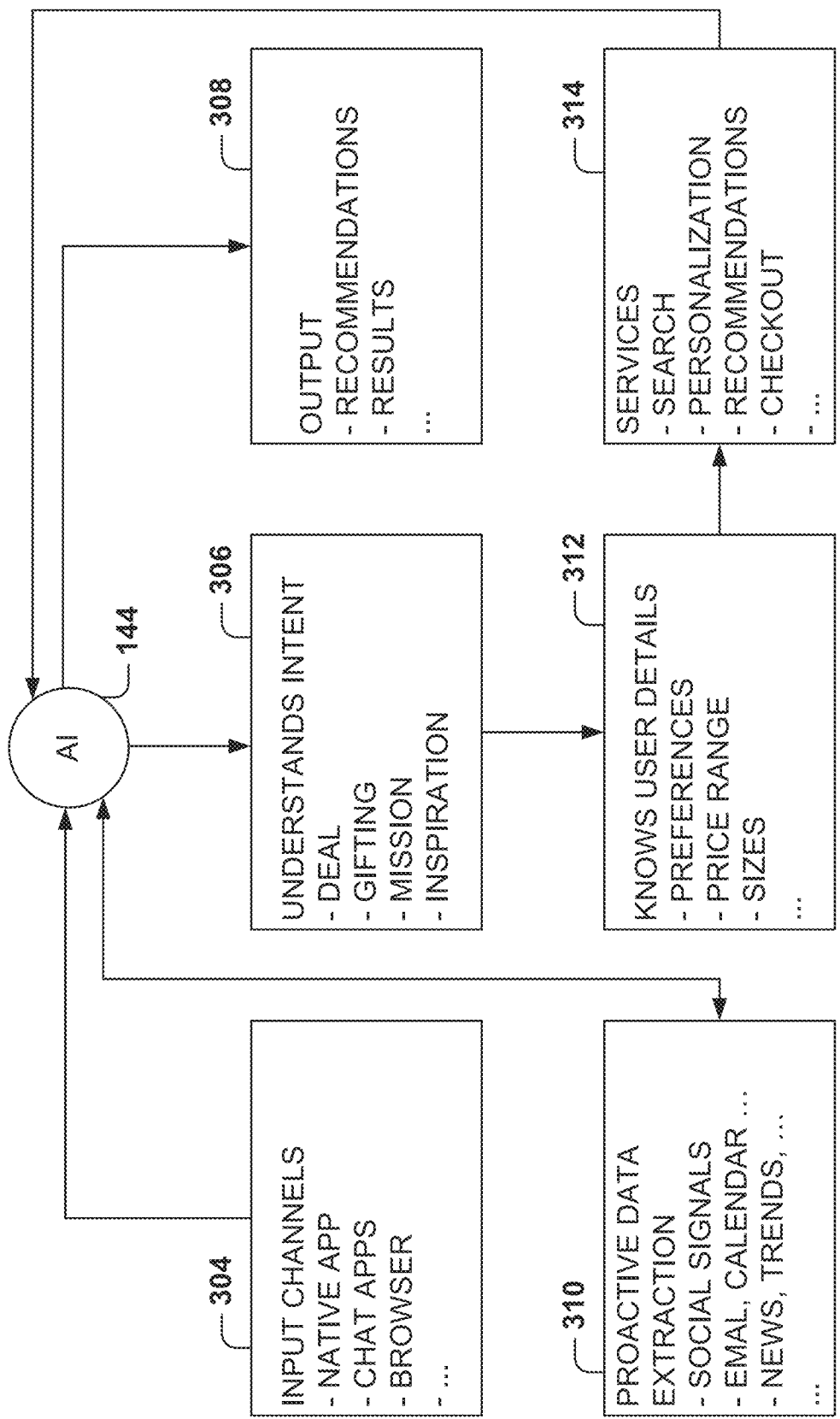
FIG. 3 illustrates the features of the artificial intelligence (AI) framework, according to some example embodiments.

FIG. 3 illustrates the features of the artificial intelligence framework (AIF) 144, according to some example embodiments. The AIF 144 is able to interact with several input channels 304, such as native commerce applications, chat applications, social networks, browsers, etc. In addition, the AIF 144 understands the intent 306 expressed by the user. For example, the intent may include a user looking for a good deal, or a user looking for a gift, or a user on a mission to buy a specific product, a user looking for suggestions, etc.

Further, the AIF 144 performs proactive data extraction 310 from multiple sources, such as social networks, email, calendar, news, market trends, etc. The AIF 144 knows about user details 312, such as user preferences, desired price ranges, sizes, affinities, etc. The AIF 144 facilitates a plurality of services within the service network, such as product search, personalization, recommendations, checkout features, etc. The output 308 may include recommendations, results, etc.

The AIF 144 is an intelligent and friendly system that understands the user's intent (e.g., targeted search, compare, shop, browse), mandatory parameters (e.g., product, product category, item), optional parameters (e.g., aspects of the item, color, size, occasion), as well as implicit information (e.g., geo location, personal preferences, age, gender). The AIF 144 responds with a well-designed response in plain language.

For example, the AIF 144 may process inputs queries, such as: "Hey!Can you help me find a pair of light pink shoes for my girlfriend please? With heels. Up to $200. Thanks;" "I recently searched for a men's leather jacket with a classic James Dean look. Think almost Harrison Ford's in the new Star Wars movie. However, I'm looking for quality in a price range of $200-300. Might not be possible, but I wanted to see!", or "I'm looking for a black Northface Thermoball jacket."

Instead of a hardcoded system, the AIF 144 provides a configurable, flexible interface with machine learning capabilities for ongoing improvement. The AIF 144 supports a commerce system that provides value (connecting the user to the things that the user wants), intelligence (knowing and learning from the user and the user behavior to recommend the right items), convenience (offering a plurality of user interfaces), easy of-use, and efficiency (saves the user time and money).

Figure 4:
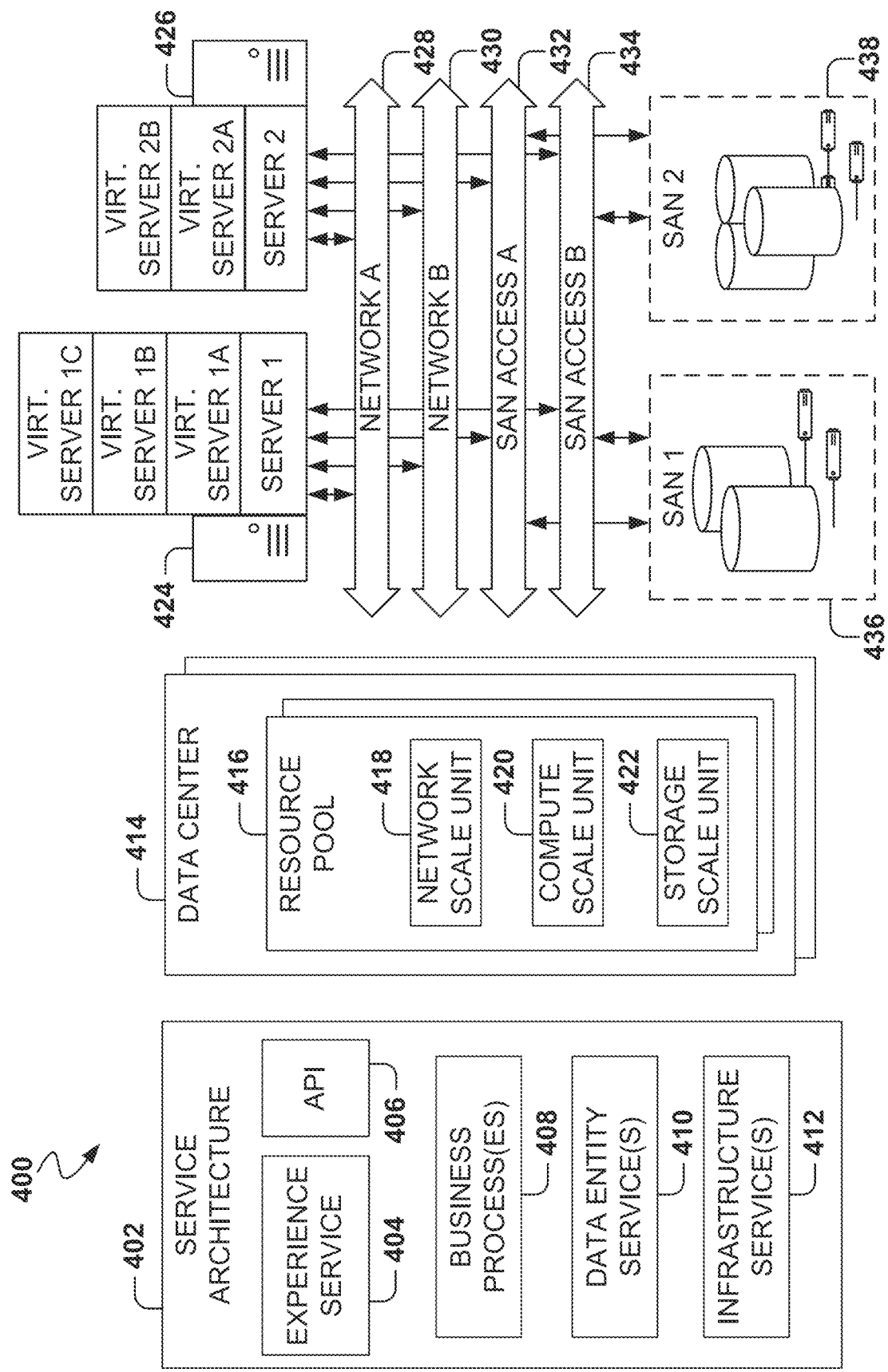
FIG. 4 is a diagram illustrating a service architecture according to some example embodiments.

FIG. 4 is a diagram illustrating a service architecture 400 according to some embodiments. The service architecture 400 presents various views of the service architecture in order to describe how the service architecture may be deployed on various data centers or cloud services. The architecture 400 represents a suitable environment for implementation of the embodiments described herein.

The service architecture 402 represents how a cloud architecture typically appears to a user, developer and so forth. The architecture is generally an abstracted representation of the actual underlying architecture implementation, represented in the other views of FIG. 1. For example, the service architecture 402 comprises a plurality of layers, that represent different functionality and/or services associated with the service architecture 402.

The experience service layer 404 represents a logical grouping of services and features from the end customer's point of view, built across different client platforms, such as applications running on a platform (mobile phone, desktop, etc.), web based presentation (mobile web, desktop web browser, etc.), and so forth. It includes rendering user interfaces and providing information to the client platform so that appropriate user interfaces can be rendered, capturing client input, and so forth. In the context of a marketplace, examples of services that would reside in this layer are home page (e.g., home view), view item listing, search/view search results, shopping cart, buying user interface and related services, selling user interface and related services, after sale experiences (posting a transaction, feedback, etc.), and so forth. In the context of other systems, the experience service layer 404 would incorporate those end user services and experiences that are embodied by the system.

The API layer 406 contains APIs which allow interaction with business process and core layers. This allows third party development against the service architecture 402 and allows third parties to develop additional services on top of the service architecture 402.

The business process service layer 408 is where the business logic resides for the services provided. In the context of a marketplace this is where services such as user registration, user sign in, listing creation and publication, add to shopping cart, place an offer, checkout, send invoice, print labels, ship item, return item, and so forth would be implemented. The business process service layer 408 also orchestrates between various business logic and data entities and thus represents a composition of shared services. The business processes in this layer can also support multi-tenancy in order to increase compatibility with some cloud service architectures.

The data entity service layer 410 enforces isolation around direct data access and contains the services upon which higher level layers depend. Thus, in the marketplace context this layer can comprise underlying services like order management, financial institution management, user account services, and so forth. The services in this layer typically support multi-tenancy.

The infrastructure service layer 412 comprises those services that are not specific to the type of service architecture being implemented. Thus, in the context of a marketplace, the services in this layer are services that are not specific or unique to a marketplace. Thus, functions like cryptographic functions, key management, CAPTCHA, authentication and authorization, configuration management, logging, tracking, documentation and management, and so forth reside in this layer.

Embodiments of the present disclosure will typically be implemented in one or more of these layers. In particular, the AIF 144, as well as the orchestrator 220 and the other services of the AIF 144.

The data center 414 is a representation of the various resource pools 416 along with their constituent scale units. This data center representation illustrates the scaling and elasticity that comes with implementing the service architecture 402 in a cloud computing model. The resource pool 416 is comprised of server (or compute) scale units 420, network scale units 418 and storage scale units 422. A scale unit is a server, network and/or storage unit that is the smallest unit capable of deployment within the data center. The scale units allow for more capacity to be deployed or removed as the need increases or decreases.

The network scale unit 418 contains one or more networks (such as network interface units, etc.) that can be deployed. The networks can include, for example virtual LANs. The compute scale unit 420 typically comprise a unit (server, etc.) that contains a plurality processing units, such as processors. The storage scale unit 422 contains one or more storage devices such as disks, storage attached networks (SAN), network attached storage (NAS) devices, and so forth. These are collectively illustrated as SANs in the description below. Each SAN may comprise one or more volumes, disks, and so forth.

The remaining view of FIG. 1 illustrates another example of a service architecture 400. This view is more hardware focused and illustrates the resources underlying the more logical architecture in the other views of FIG. 1. A cloud computing architecture typically has a plurality of servers or other systems 424, 426. These servers comprise a plurality of real and/or virtual servers. Thus the server 424 comprises server 1 along with virtual servers 1A, 1B, 1C and so forth.

The servers are connected to and/or interconnected by one or more networks such as network A 428 and/or network B 430. The servers are also connected to a plurality of storage devices, such as SAN 1 (436), SAN 2 (438) and so forth. SANs are typically connected to the servers through a network such as SAN access A 432 and/or SAN access B 434.

The compute scale units 420 are typically some aspect of servers 424 and/or 426, like processors and other hardware associated therewith. The network scale units 418 typically include, or at least utilize the illustrated networks A (428) and B (432). The storage scale units typically include some aspect of SAN 1 (436) and/or SAN 2 (438). Thus, the logical service architecture 402 can be mapped to the physical architecture.

Services and other implementation of the embodiments described herein will run on the servers or virtual servers and utilize the various hardware resources to implement the disclosed embodiments.

Figure 5:
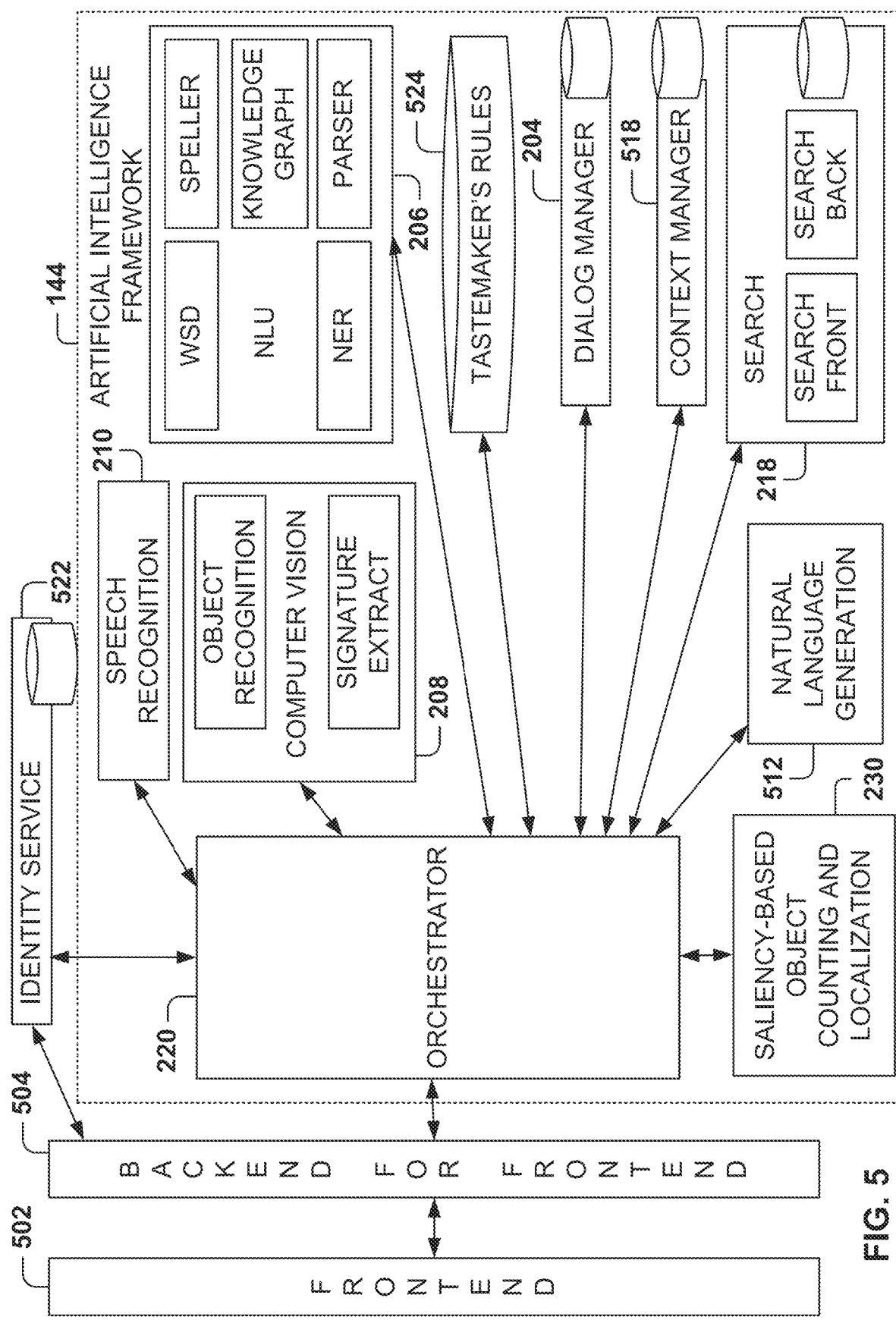
FIG. 5 is a block diagram for implementing the AI framework, according to some example embodiments.

FIG. 5 is a block diagram for implementing the AIF 144, according to some example embodiments. Specifically, the intelligent personal assistant system 142 of FIG. 2 is shown to include a front end component 502 (FE) by which the intelligent personal assistant system 142 communicates (e.g., over the network 104) with other systems within the network architecture 100. The front end component 502 can communicate with the fabric of existing messaging systems. As used herein, the term messaging fabric refers to a collection of APIs and services that can power third party platforms such as Facebook messenger, Microsoft Cortana, and others "bots." In one example, a messaging fabric can support an online commerce ecosystem that allows users to interact with commercial intent. Output of the front end component 502 can be rendered in a display of a client device, such as the client device 110 in FIG. 1 as part of an interface with the intelligent personal assistant.

The front end component 502 of the intelligent personal assistant system 142 is coupled to a back end component 504 for the front end (BFF) that operates to link the front end component 502 with the AIF 144. The artificial intelligence framework 144 includes several components discussed below.

In one example embodiment, an orchestrator 220 orchestrates communication of components inside and outside the artificial intelligence framework 144. Input modalities for the AI orchestrator 206 are derived from a computer vision component 208, a speech recognition component 210, and a text normalization component which may form part of the speech recognition component 210. The computer vision component 208 may identify objects and attributes from visual input (e.g., photo). The speech recognition component 210 converts audio signals (e.g., spoken utterances) into text. The text normalization component operates to make input normalization, such as language normalization by rendering emoticons into text, for example. Other normalization is possible such as orthographic normalization, foreign language normalization, conversational text normalization, and so forth.

The artificial intelligence framework 144 further includes a natural language understanding (NLU) component 206 that operates to parse and extract user intent and intent parameters (for example mandatory or optional parameters). The NLU component 206 is shown to include sub-components such as a spelling corrector (speller), a parser, a named entity recognition (NER) sub-component, a knowledge graph, and a word sense detector (WSD).

The artificial intelligence framework 144 further includes a dialog manager 204 that operates to understand a "completeness of specificity" (for example of an input, such as a search query or utterance) and decide on a next action type and a parameter (e.g., "search" or "request further information from user"). In one example, the dialog manager 204 operates in association with a context manager 518 and a natural language generation (NLG) component 512. The context manager 518 manages the context and communication of a user with respect to online personal assistant (or "bot") and the assistant's associated artificial intelligence. The context manager 518 comprises two parts: long term history and short term memory. Data entries into one or both of these parts can include the relevant intent and all parameters and all related results of a given input, bot interaction, or turn of communication, for example. The NLG component 512 operates to compose a natural language utterance out of a AI message to present to a user interacting with the intelligent bot.

A search component 218 is also included within the artificial intelligence framework 144. As shown, the search component 218 has a front-end and a back-end unit. The back-end unit operates to manage item and product inventory and provide functions of searching against the inventory, optimizing towards a specific tuple of intent and intent parameters. An identity service 522 component, that may or may not form part of artificial intelligence framework 144, operates to manage user profiles, for example explicit information in the form of user attributes (e.g., "name," "age," "gender," "geolocation"), but also implicit information in forms such as "information distillates" such as "user interest," or ""similar persona," and so forth. The identity service 522 includes a set of policies, APIs, and services that elegantly centralizes all user information, enabling the AIF 144 to have insights into the users' wishes. Further, the identity service 522 protects the commerce system and its users from fraud or malicious use of private information.

A saliency-based object counting and localization component 230 is also included within the artificial intelligence framework 144. The saliency-based object counting and localization component 230 is discussed in connection with FIGS. 13-20.

The functionalities of the artificial intelligence framework 144 can be set into multiple parts, for example decision-making and context parts. In one example, the decision-making part includes operations by the orchestrator 220, the NLU component 206 and its subcomponents, the dialog manager 204, the NLG component 512, the computer vision component 208 and speech recognition component 210. The context part of the AI functionality relates to the parameters (implicit and explicit) around a user and the communicated intent (for example, towards a given inventory, or otherwise). In order to measure and improve AI quality over time, in some example embodiments, the artificial intelligence framework 144 is trained using sample queries (e.g., a development set) and tested on a different set of queries (e.g., an [0001] evaluation set), both sets to be developed by human curation or from use data. Also, the artificial intelligence framework 144 is to be trained on transaction and interaction flows defined by experienced curation specialists, or human override 524. The flows and the logic encoded within the various components of the artificial intelligence framework 144 define what follow-up utterance or presentation (e.g., question, result set) is made by the intelligent assistant based on an identified user intent.

The intelligent personal assistant system 142 seeks to understand a user's intent (e.g., targeted search, compare, shop, browse, and so forth), mandatory parameters (e.g., product, product category, item, and so forth), and optional parameters (e.g., explicit information, e.g., aspects of item/product, occasion, and so forth), as well as implicit information (e.g., geolocation, personal preferences, age and gender, and so forth) and respond to the user with a content-rich and intelligent response. Explicit input modalities can include text, speech, and visual input and can be enriched with implicit knowledge of user (e.g., geolocation, gender, birthplace, previous browse history, and so forth). Output modalities can include text (such as speech, or natural language sentences, or product-relevant information, and images on the screen of a smart device e.g., client device 110. Input modalities thus refer to the different ways users can communicate with the bot. Input modalities can also include keyboard or mouse navigation, touch-sensitive gestures, and so forth.

In relation to a modality for the computer vision component 208, a photograph can often represent what a user is looking for better than text. Also, the computer vision component 208 may be used to form shipping parameters based on the image of the item to be shipped. The user may not know what an item is called, or it may be hard or even impossible to use text for fine detailed information that an expert may know, for example a complicated pattern in apparel or a certain style in furniture. Moreover, it is inconvenient to type complex text queries on mobile phones and long text queries typically have poor recall. Key functionalities of the computer vision component 208 include object localization, object recognition, optical character recognition (OCR) and matching against inventory based on visual cues from an image or video. A bot enabled with computer vision is advantageous when running on a mobile device which has a built-in camera. Powerful deep neural networks can be used to enable computer vision applications.

With reference to the speech recognition component 210, a feature extraction component operates to convert raw audio waveform to some-dimensional vector of numbers that represents the sound. This component uses deep learning to project the raw signal into a high-dimensional semantic space. An acoustic model component operates to host a statistical model of speech units, such as phonemes and allophones. These can include Gaussian Mixture Models (GMM) although the use of Deep Neural Networks is possible. A language model component uses statistical models of grammar to define how words are put together in a sentence. Such models can include n-gram-based models or Deep Neural Networks built on top of word embeddings. A speech-to-text (STT) decoder component converts a speech utterance into a sequence of words typically leveraging features derived from a raw signal using the feature extraction component, the acoustic model component, and the language model component in a Hidden Markov Model (HMM) framework to derive word sequences from feature sequences. In one example, a speech-to-text service in the cloud has these components deployed in a cloud framework with an API that allows audio samples to be posted for speech utterances and to retrieve the corresponding word sequence. Control parameters are available to customize or influence the speech-to-text process.

Machine-learning algorithms may be used for matching, relevance, and final re-ranking by the AIF 144 services. Machine learning is a field of study that gives computers the ability to learn without being explicitly programmed. Machine learning explores the study and construction of algorithms that can learn from and make predictions on data. Such machine-learning algorithms operate by building a model from example inputs in order to make data-driven predictions or decisions expressed as outputs. Machine-learning algorithms may also be used to teach how to implement a process.

Deep learning models, deep neural network (DNN), recurrent neural network (RNN), convolutional neural network (CNN), and long short-term CNN, as well as other ML models and IR models may be used. For example, search 218 may use n-gram, entity, and semantic vector-based query to product matching. Deep-learned semantic vectors give the ability to match products to non-text inputs directly. Multi-leveled relevance filtration may use BM25, predicted query leaf category+product leaf category, semantic vector similarity between query and product, and other models, to pick the top candidate products for the final re-ranking algorithm.

Predicted click-through-rate and conversion rate, as well as GMV, constitutes the final re-ranking formula to tweak functionality towards specific business goals, more shopping engagement, more products purchased, or more GMV. Both the click prediction and conversion prediction models take in query, user, seller and product as input signals. User profiles are enriched by learning from onboarding, sideboarding, and user behaviors to enhance the precision of the models used by each of the matching, relevance, and ranking stages for individual users. To increase the velocity of model improvement, offline evaluation pipeline is used before online A/B testing.

In one example of an artificial intelligence framework 144, two additional parts for the speech recognition component 210 are provided, a speaker adaptation component and an LM adaptation component. The speaker adaptation component allows clients of an STT system (e.g., speech recognition component 210) to customize the feature extraction component and the acoustic model component for each speaker. This can be important because most speech-to-text systems are trained on data from a representative set of speakers from a target region and typically the accuracy of the system depends heavily on how well the target speaker matches the speakers in the training pool. The speaker adaptation component allows the speech recognition component 210 (and consequently the artificial intelligence framework 144) to be robust to speaker variations by continuously learning the idiosyncrasies of a user's intonation, pronunciation, accent, and other speech factors and apply these to the speech-dependent components, e.g., the feature extraction component, and the acoustic model component. While this approach utilizes a non-significant-sized voice profile to be created and persisted for each speaker, the potential benefits of accuracy generally far outweigh the storage drawbacks.

The language model (LM) adaptation component operates to customize the language model component and the speech-to-text vocabulary with new words and representative sentences from a target domain, for example, inventory categories or user personas. This capability allows the artificial intelligence framework 144 to be scalable as new categories and personas are supported.

The AIF's goal is to provide a scalable and expandable framework for AI, one in which new activities, also referred to herein as missions, can be accomplished dynamically using the services that perform specific natural-language processing functions. Adding a new service does not require to redesign the complete system. Instead, the services are prepared (e.g., using machine-learning algorithms) if necessary, and the orchestrator is configured with a new sequence related to the new activity. More details regarding the configuration of sequences are provided below with reference to FIGS. 6-13.

Embodiments presented herein provide for dynamic configuration of the orchestrator 220 to learn new intents and how to respond to the new intents. In some example embodiments, the orchestrator 220 "learns" new skills by receiving a configuration for a new sequence associated with the new activity. The sequence specification includes a sequence of interactions between the orchestrator 220 and a set of one or more service servers from the AIF 144. In some example embodiments, each interaction of the sequence includes (at least): identification for a service server, a call parameter definition to be passed with a call to the identified service server, and a response parameter definition to be returned by the identified service server.

In some example embodiments, the services within the AIF 144, except for the orchestrator 220, are not aware of each other, e.g., they do not interact directly with each other. The orchestrator 220 manages all the interactions with the other servers. Having the central coordinating resource simplifies the implementation of the other services, which need not be aware of the interfaces (e.g., APIs) provided by the other services. Of course, there can be some cases where a direct interface may be supported between pairs of services.

Figure 6:
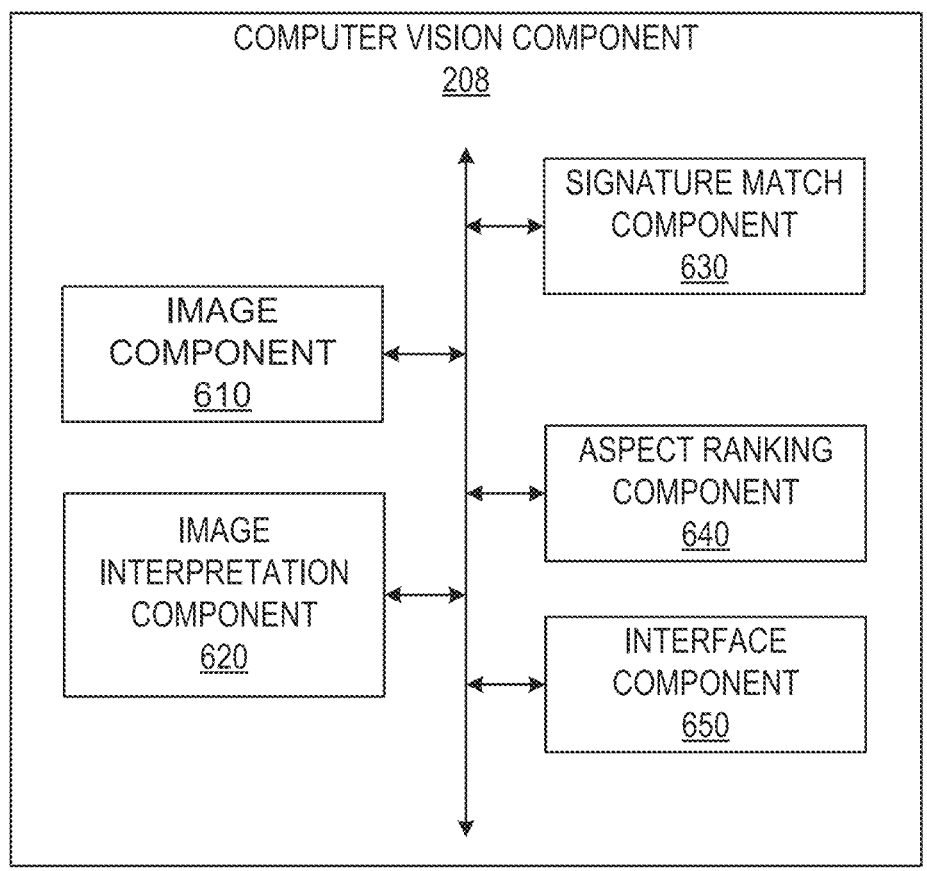
FIG. 6 is a block diagram of an example computer vision component, according to some example embodiments.

FIG. 6 is a block diagram illustrating components of the computer vision component 208, according to some example embodiments. The computer vision component 208 is shown as including an image component 610, an image interpretation component 620, a signature match component 630, an aspect rank component 640, and an interface component 650 all configured to communicate with one another (e.g., via a bus, shared memory, or a switch). Any one or more of the modules described herein may be implemented using hardware (e.g., one or more processors of a machine) or a combination of hardware and software. For example, any module described herein may configure a processor (e.g., among one or more processors of a machine) to perform operations for which that module is designed. Moreover, any two or more of these modules may be combined into a single module, and the functions described herein for a single module may be subdivided among multiple modules. Furthermore, according to various example embodiments, modules described herein as being implemented within a single machine, database(s) 126, or device (e.g., client device 110) may be distributed across multiple machines, database(s) 126, or devices.

Figure 7:
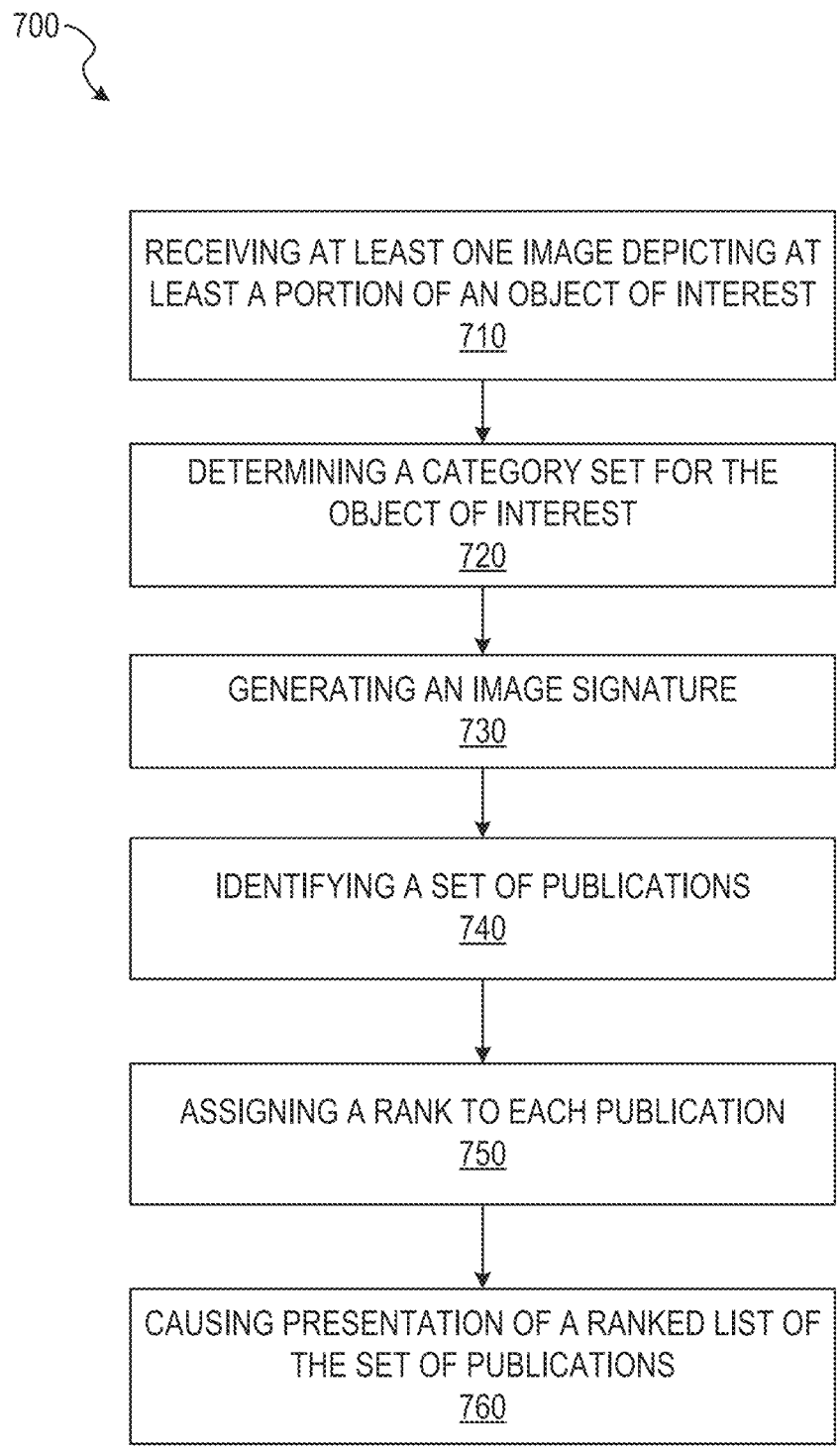
FIG. 7 is flowchart of a method for identifying a set of images based on image recognition, image signatures, and category prediction, according to some example embodiments.

FIG. 7 is a flowchart of operations of the computer vision component 208 in performing a method 700 of identifying a set of images based on image recognition, image signatures, and category prediction, according to some example embodiments. While the various operations in this flowchart are presented and described sequentially, one of ordinary skill will appreciate that some or all of the operations may be executed in a different order, be combined or omitted, or be executed in parallel. Operations in the method 700 may be performed by the computer vision component 208, using components described above with respect to FIG. 6. In some embodiments, operations of the method 700 are performed by or in conjunction with components of the computer vision component 208 and components of the artificial intelligence framework 144.

In operation 710, the image component 610 receives at least one image depicting at least a portion of an object of interest. In some embodiments, the image component 610 receives the at least one image from a user device associated with a user of the publication system 102 (e.g., the networked system 102). For example, the user device may be an image capture device (e.g., a camera), a mobile computing device (e.g., a laptop, a smartphone, a tablet), a desktop computing device (e.g., a personal computer), or any other suitable user device. In these embodiments, an application associated with the computer vision component 208 may prompt capture of the at least one image, such that upon capture of a still image the image component 610 receives the image. Where the at least one image is a set of frames in a video, the application for the computer vision component 208 may prompt capture of the at least one image and the image component 610 receives the set of frames in the video while the video is being captured (e.g., in real time or near real time). The set of frames may also be received by the image component 610 after termination of a capture session, such that the set of frames of the video have been captured and are received by the access component 610 as a closed set of images, instead of a video stream. For example, upon opening the application on the user device, a user interface element (e.g., a user interface element of the application, of the image component 610, or of the interface component 650) may access an image capture device associated with the user device and cause presentation of a field of view of the image capture device within the user interface of the application. Interaction with the user interface of the application causes the image capture device to initiate capture of one or more images within the field of view and cause the user device to transmit the one or more images to the image component 610. In these instances, the computer vision component 208, by operation of the application on the user device, may control or at least partially control the user device in the capture and transmission of the at least one image or set of frames for receipt by the image component 610.

In some embodiments, the image component 610 receives the at least one image from a data storage device. For example, upon opening the application of the computer vision component 208, a user interface element may cause presentation of a set of images on the data storage device. The data storage device may be associated with the user device by direct connection (e.g., an onboard data storage device such as a hard drive) or by remote connection (e.g., a data storage device implemented on a server, cloud storage device, or other machine accessible by the user device). The user interface element may cause presentation of the set of images by causing the user device to access the data storage device and populate the set of images to the user interface element. For example, computer executable instructions of the user interface element or transmitted by the image component 610 or the interface component 650 may cause the user interface to access and open a file folder or set of images locally stored on the user device or access a file folder or set of images stored within a remote data storage location (e.g., a cloud storage device or network-based server). After accessing the set of images, locally or remotely stored, the executable instructions cause the user device to present a representation of the set of images (e.g., thumbnails, tiles, or file names) within the user interface of the application.

In some example embodiments, the image component 610 receives the at least one image from the data storage device in a request from the user device. In these instances, the application of the computer vision component 208, once opened, receives a representation of a data storage location (e.g., a network address) of the image to be received by the image component 610. In response to receiving the request, the image component 610 generates and transmits a request to the data storage device. The request from the image component 610 may include the data storage location and an identification of the at least one image. The image component 610 may then receive the at least one image from the data storage device in a response to the request.

In operation 720, the image interpretation component 620 determines a category set for the object of interest. In some embodiments, the image interpretation component 620 comprises one or more machine learning processes to perform image analysis on the at least one image and the object of interest, or portion thereof, depicted within the at least one image. In some instances, the one or more machine learning processes comprise a neural network. For example, as described below, in some embodiments, the image interpretation component 620 comprises and uses multiple layers of a deep residual network to perform image processing and analysis to determine the category set. The deep residual network may be a fully-connected, convolutional neural network.

Although described with respect to a deep residual network, it should be understood that the image interpretation component 620 may comprise any suitable image processing and analysis functionality to perform the functions of the image interpretation component 620 described herein. For example, the image interpretation component 620 may comprise a neural network, a partially connected neural network, a fully connected neural network, a convolutional neural network, a set of machine learning components, a set of image recognition components, a set of pattern recognition components, a set of computer vision components, or any other suitable instructions, modules, components, or processes capable of performing one or more of the functions of the image interpretation component 620 described herein.

In some instances, the image interpretation component 620 determines the category set for the object of interest, or portion thereof, using one or more image recognition processes. In some embodiments, the image recognition processes comprise pattern recognition, edge detection, outline recognition, text recognition, feature recognition or detection, feature extraction, Eigenvectors, facial recognition, machine learning based image recognition, neural network based image recognition, and other suitable operations configured to identify and characterize the object of interest within the at least one image. The image interpretation component 620 may receive the at least one image from the image component 610. In some embodiments, in response to receiving the at least one image, the image interpretation component 620 identifies and classifies the object of interest within the at least one image. The image interpretation component 620 selects one or more categories for the category set representing the identification and classification of the object of interest.

In some example embodiments, categories included in the category set are associated with one or more publications of a publication corpus. A category hierarchy tree may arrange each publications of a publication corpus into a hierarchy in accordance. In some example embodiments, the publication categories are then organized into a hierarchy (e.g., a map or tree), such that more general categories include more specific categories. Each node in the tree or map is a publication category that has a parent category (e.g., a more general category with which the publication category is associated) and potentially one or more child categories (e.g., narrow or more specific categories associated with the publication category.). Each publication category is associated with a particular static webpage.

In accordance with some example embodiments, a plurality of publications are grouped together into publication categories. By way of example, each category is labeled with a letter (e.g., category A-category AJ). In addition, every publication category is organized as part of a hierarchy of categories. In this example, category A is a general product category that all other publication categories descend from. Publications in category A are then divided in to at least two different publication categories, category B and category C. It should be noted that each parent category (e.g., in this case category A is a parent category to both Category B and Category C) may include a large number of child categories (e.g., subcategories). In this example, publication categories B and C both have subcategories (or child categories). For example, if Category A is clothing publications, Category B can be Men's clothes publications and Category C is Women's clothes publications. Subcategories for Category B include category D, category E, and category F. Each of subcategories D, E, and F have a different number of subcategories, depending on the specific details of the publications covered by each subcategory.

For example, if category D is active wear publications, category E is formal wear publications, and category F is outdoor wear publications, each subcategory includes different numbers and types of subcategories. For example, category D (active wear publications in this example) includes subcategories I and J. Subcategory I includes Active Footwear publications (for this example) and Subcategory J includes t-shirt publications. As a result of the differences between these two subcategories, subcategory I includes four additional subcategories (subcategories K-N) to represent different types of active footwear publications (e.g., running shoe publications, basketball shoe publications, climbing shoe publications, and tennis shoe publications). In contrast, subcategory J (which, in this example, is for t-shirt publications) does not include any subcategories (although in a real product database a t-shirt publications category would likely include subcategories). Thus, each category has a parent category (except for the uppermost product category) which represents a more general category of publications and one or more child categories or subcategories (which are a more specific publications category within the more general category). Thus, category E has two sub-categories, O and P, and each subcategory has two child product categories, categories Q and R and categories S and T, respectively. Similarly, category F has three sub-categories (U, V, and W). Category C, a product category that has Category A as its parent, includes two additional subcategories (G and H). Category G includes two children (X and AF). Category X includes subcategories Y and Z, and Y includes AA-AE. Category H includes subcategories AG and AH. Category AG includes categories AI and AJ.

In some embodiments, representative images for publications, or all images included in publications, of the publication corpus are clustered within categories. In these instances, images having similar image signatures, aspects, visual appearance elements, characteristics, metadata, and other attributes, are assigned or otherwise clustered within similar categories. The image clusters may be associated with one or more category. In some instances, the image clusters include sub-clusters, such that hierarchical categories are represented by sub-clusters within a cluster for a patent category. In some embodiments, images are clustered within a category by accessing iconic images (e.g., common representative images for a category). The image interpretation component 620 determines closest matches between an input semantic vector and an iconic semantic vector for the iconic image. Non-iconic images may be ignored to speed up processing. Responsive to the closest matching cluster being the cluster of previously miscategorized images, the probability that the input image has this category is decreased. Responsive to unbalanced clusters, the clusters are rebalanced. This can repeat until the clusters are balanced or more balanced, such that comparable numbers of images are in each cluster.

In some example embodiments, operation 720 is performed using one or more sub-operations. In these embodiments, an input image (e.g., the at least one image) is transmitted from a device operated by a user. The user may be searching for a publication in a publication corpus. The user may be posting a new publication with publication images, and rely on the process flow to help provide the category. An input semantic vector corresponding to the input image is accessed. As will be described below, the input semantic vector may be an image signature for the input image or at least one image. The image interpretation component 620, having the input semantic vector, may compare the input semantic vector to semantic vectors associated with each category of the publication categories for the publication corpus. In some embodiments, the semantic vectors associated with each category are representative semantic vectors generated using one or more of a set of images associated with each category and a set of metadata or descriptive terms associated with each category. In some instances, the input image lacks category metadata. The missing category metadata is added to the input image, responsive to a category probability exceeding a minimum threshold. In another embodiment, at least one category probability is provided for the input image that was not missing metadata, to double check the metadata. Where the image interpretation component 620 analyzes images within image clusters, clustered by category and sub-category, an input image (e.g., the at least one image) has a high semantic similarity with a cluster of images or an iconic image selected for an image cluster, the image interpretation component 620 will assign a higher probability that the category or categories associated with the iconic image are related to the input image. Thus the image interpretation component 620 is more likely to select the category of the iconic image or image cluster as a category for inclusion in the category set.

In some example embodiments, the image interpretation component 620, operating as a machine learned model, may be trained using input images. In these instances, a training image is input to a machine learned model. The training image is processed with the machine learned model (e.g., the image interpretation component 620). The training category is output from the machine learned model. The machine learned model is trained by feeding back to the machine learned model whether or not the training category output was correct.

In an example embodiment, a machine-learned model is used to embed the deep latent semantic meaning of a given listing title and project it to a shared semantic vector space. A vector space can be referred to as a collection of objects called vectors. Vectors spaces can be characterized by their dimension, which specifies the number of independent directions in the space. A semantic vector space can represent phrases and sentences and can capture semantics for image search and image characterization tasks. In further embodiments, a semantic vector space can represent audio sounds, phrases, or music; video clips; and images and can capture semantics for image search and image characterization tasks.

In various embodiments, machine learning is used to maximize the similarity between the source (X), for example, a listing title, and the target (Y), the search query. A machine-learned model may be based on deep neural networks (DNN) or convolutional neural networks (CNN). The DNN is an artificial neural network with multiple hidden layers of units between the input and output layers. The DNN can apply the deep learning architecture to recurrent neural networks. The CNN is composed of one or more convolution layers with fully connected layers (such as those matching a typical artificial neural network) on top. The CNN also uses tied weights and pooling layers. Both the DNN and CNN can be trained with a standard backpropagation algorithm.

When a machine-learned model is applied to mapping a specific <source, target> pair, the parameters for machine-learned Source Model and machine-learned Target Model are optimized so that relevant <source, target> pair has closer vector representation distance. The following formula can be used to compute the minimum distance.

$$SrcMod^*, TgtMod^* = \operatorname*{argmin}_{k\ in\ all\ training\ pairs} \sum \|SrcVec^k - TgtVec^k\|$$

In the above-depicted formula, ScrSeq=a source sequence; TgtSeq=a target sequence; SrcMod=source machine-learned model; TgtMod=target machine-learned model; SrcVec=a continuous vector representation for a source sequence (also referred to the semantic vector of the source); and TgtVec=a continuous vector representation for a target sequence (also referred to as semantic vector of the target). The source machine-learned model encodes the source sequence into a continuous vector representation. The target machine-learned model encodes the target sequence into a continuous vector representation. In an example embodiment, the vectors each have approximately 100 dimensions.

In other embodiments, any number of dimensions may be used. In example embodiments, the dimensions of the semantic vectors are stored in a KD tree structure. The KD tree structure can be referred to a space-partitioning data structure for organizing points in a KD space. The KD tree can be used to perform the nearest-neighbor lookup. Thus, given a source point in space, the nearest-neighbor lookup may be used to identify the closest point to the source point.

As referenced above, the image interpretation component 620 may be a machine learning component. In some example embodiments, the image interpretation component 620 is a deep residual network (e.g., a type of neural network). In these embodiments, the image interpretation component 620 processes the at least one image using a set of neural network layers. The neural network layers may be generated using one or more network kernels. In some instances, the one or more network kernels comprise a convolution kernel, a pooling kernel, a merge kernel, a derivative kernel, any other suitable kernel, or combinations thereof. A convolution kernel may process an input image by interatively processing a set of regions, overlapping regions, or pixels within the image. The convolution kernel may act as a basis for one or more of image filtering, image recognition, or other image processing. For example, the convolutional kernel may act as one or more of a merge kernel (e.g., blurring at least a portion of the image), a derivative kernel (e.g., supporting edge detection), or any other suitable kernel process. A portion of the layers of the neural network may use the convolution kernel and may be applied to small regions or individual pixels. A portion of the layers may be pooling layers. The pooling layers may subsample values from the image to perform non-linear down-sampling. For example, a pooling layer may partition the at least one image into a set of regions and output a maximum value or average value for each region. Although described as partitioning, in some instances, the pooling layer may receive an indication of a previously determined partition, and down-sample using the predetermined region partition.

Operation 720 comprises one or more sub-operations. In some example embodiments, the image interpretation component 620 identifies a set of aspects representing one or more attributes of the object of interest within the at least one image. In identifying and classifying the at least one image, the image interpretation component 620 uses the one or more functions described above to identify the one or more attributes constituting elements of a visual appearance of the object of interest. Each aspect corresponds to at least one of the attributes (e.g., elements of the visual appearance) and a descriptive word associated with a specified attribute. For example, the image interpretation component 620 may identify a pair of red pants as the object of interest in the at least one image. The image interpretation component 620 may identify the set of aspects as including attributes comprising a predicted style (e.g., ankle length pants), a color (e.g., red), a pattern (e.g., solid), a brand, a material (e.g., denim), a season (e.g., a season or portion of the year suitable for wearing the pants), and a clothing type (e.g., casual clothing and "bottoms"). Each attribute may be represented by a descriptive word, such as pants, red, solid, denim, autumn, casual clothing, and bottoms. In this example, each descriptive word is the representation of an element of the visual appearance of the object of interest.

In some embodiments, the image interpretation component 620 identifies aspects by generating an input semantic vector (e.g., a set of words, phrases, descriptive terms, characteristics, or aspects) corresponding to the input image. The input semantic vector, or portions thereof, may be identified by matching the image signature to previously determined semantic vectors for similar image signatures. The closest matches are identified between the input semantic vector and publication image vectors that are representative of multiple aspects. The input semantic vectors (e.g., a set of descriptive terms), or portions thereof, may be selected from among one or more publication semantic vectors which are determined to be a match. The machine learned model may be used along with XOR operations for speed. A number of common bits from the XOR operation may be used as a measure of similarity. In some instances, the closest matches are identified between the input semantic vector and publication image vectors that are representative of multiple aspects by finding nearest neighbors in semantic vector space. After either of the previous processes, multiple aspect probabilities are provided, based on the machine learned model, and the set of aspects are identified based on the multiple aspect probabilities. For example, aspects may be selected for inclusion in the set of aspects based on exceeding a probability threshold.

In a subsequent sub-operation of operation 720, the image interpretation component 620 determines one or more categories associated with at least one aspect of the set of aspects for inclusion in the category set. The image interpretation component 620 may compare the set of aspects to a global category set and selects the one or more categories for inclusion in the category set. In some embodiments, each category of the global category set are associated with one or more keywords, descriptors, or elements of visual appearance. The image interpretation component 620 matches the set of aspects to the keywords associated with the one or more categories and selects the one or more categories for inclusion in the category set. In some instances, the image interpretation component 620 identifies a probability for each category included in the category set. The probabilities may be determined using a number of keywords associated with a category matching the set of aspects, a percentage of the set of aspects identified as matching or being semantically related to keywords of a category, or any other suitable manner.

In operation 730, the image interpretation component 620 generates an image signature for the at least one image. The image signature comprises a vector representation of the at least one image. In some embodiments, the image signature is a binary vector representation of the at least one image, where each value of the vector is either one or zero. Where the image interpretation component 620 comprises a neural network or deep residual network, the image interpretation component 620 uses a hashing layer of the neural network to generate the image signature. The hashing layer may receive floating point values from one or more of the connected layers of the deep residual neural network. The hashing layer may generate the vector representation using the floating point values. In some embodiments, the floating point values are values between one and zero. Where the image signature is a binary hash, the hashing layer may compare the floating point values to a threshold to convert the floating point values to binary values. For example, the vector may be a vector of 4096 dimensions. The values of the vector may be between one and zero. Upon generating the vector, the hashing layer may convert the vector to a binary vector to generate a binary image signature. The values of the vector may be compared to a threshold, such as 0.5. Values exceeding the threshold may be converted to a value of one in the binary image signature and values below the threshold may be converted to a value of zero in the binary image signature.

In operation 740, the signature match component 630 identifies a set of publications within a publication database. The signature match component 630 identifies the set of publications using the category set and the image signature for the at least one image. In some embodiments, the signature match component 630 identifies the set of publications automatically upon receiving the category set and the image signature from the image interpretation component 620. The signature match component 630 identifies the set of publications by searching the publication database using the category set and the image signature. In some embodiments, the publications of the publication database are partitioned or otherwise organized by categories. In these instances, the signature match component 630 matches one or more categories of the publication database with the category set identified for the at least one image. The signature match component 630 may search only a subset of publications associated with the one or more categories matching a category of the category set.

Once the subset of publications has been identified, the signature matching component 630 may identifies publication image signatures associated with images included in publications of the subset of publications. The signature match component 630 compares the image signature generated for the at least one image to the publication image signatures. In some instances, the signature matching component 630 determines a Hamming distance between the image signature of the at least one image and each publication image signature for images associated with or included in each publication of the subset of publications.

In operation 750, the signature match component 630 assigns a rank to each publication of the set of publications based on the image signature. The signature match component 630 generates a ranked list of publications using the ranks assigned to each publication. The ranked list of publications comprising at least a portion of the set of publications. In embodiments where the signature matching component 630 determines the Hamming distance between the image signature of the at least one image and each publication image signature, the signature matching component 630 uses the calculated Hamming distance of each publication image signature as a ranking score. The signature match component 630 assigns the rank to each publication based on the ranking score (e.g., the Hamming distance calculated for each publication image signature), ordering the publications in ascending order of Hamming distances. In these instances, a publication having a smaller Hamming distance is placed higher in the ranked list of publications (e.g., an ordered list) than a publication having a larger Hamming distance.

In operation 760, the interface component 650 causes presentation of the ranked list of publications at a computing device associated with a user. In some embodiments, the computing device is a device (e.g., a mobile computing device such as a smartphone) from which the at least one image was received. The interface component 650 causes presentation of the ranked list of publications within a user interface of the computing device or accessible to the computing device. Each publication presented within the ranked list is associated with an image, the image signature of which is used for matching the publication to the at least one image in operation 750.

Figure 8:
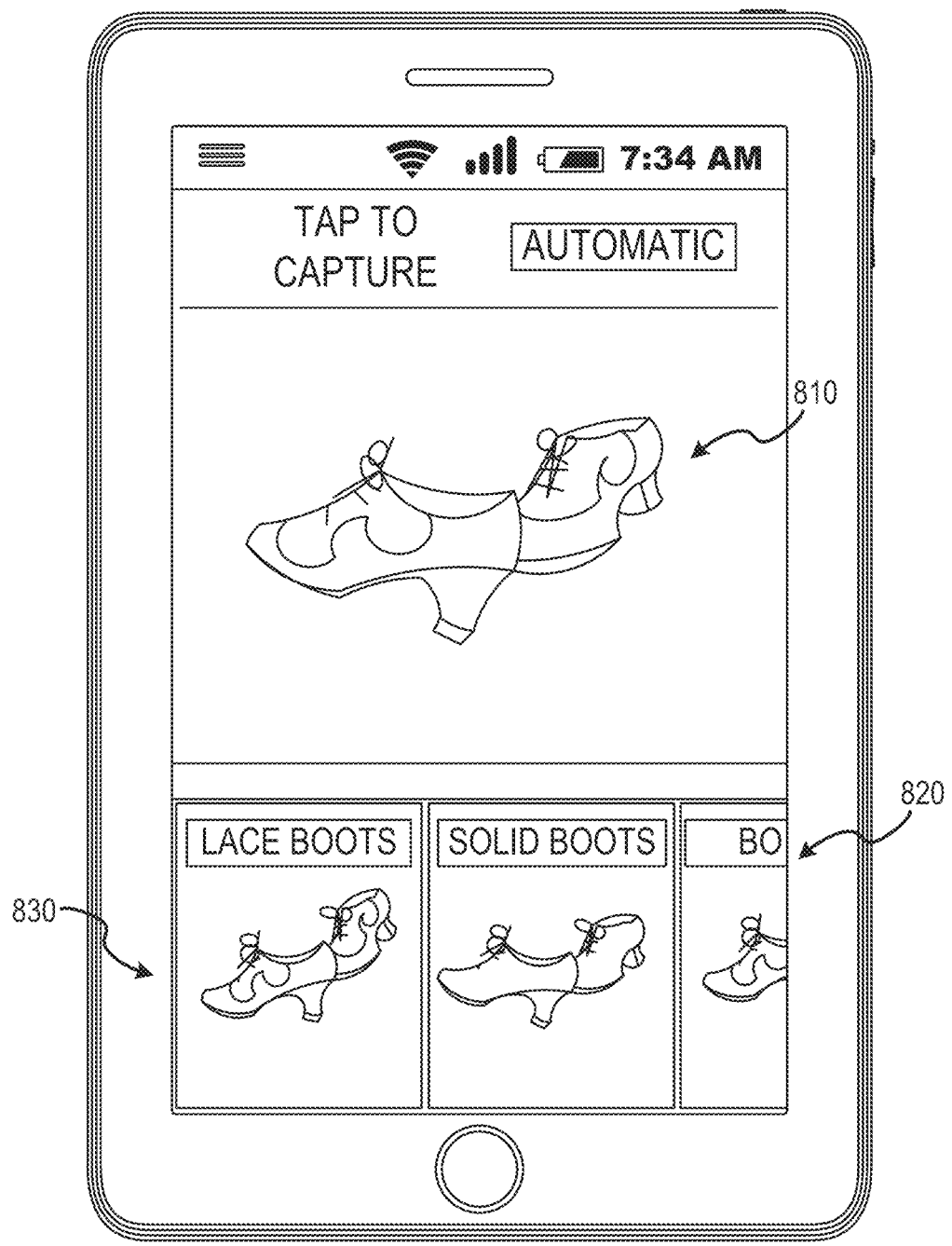
FIG. 8 is an example interface diagram illustrating a user interface screen of the intelligent assistant, according to some example embodiments.

In some embodiments, each publication of the ranked list of publications is presented using a publication identification (e.g., a title or descriptive word or phrase) and a representation of the image associated with the image signature used to identify and rank the publication. For example, as shown in FIG. 8, the interface component 650 causes presentation of the at least one image 810 received at operation 710 and the ranked list of publications 820. The ranked list of publications are presented within a selectable user interface element comprising a title of the publication (e.g., publication identification) and a representative image for the publication (e.g., the image associated with the image signature used to match and rank the publication). Selection of the user interface element for a publication within the ranked list may cause presentation of the full publication, comprising the publication identification, one or more images, and additional detail for the publication.

In some embodiments, the additional detail includes one or more of a set of categories for the publication, an item listing for an electronic commerce system or website associated with the publication, a location associated with the publication, a or any other suitable detail. Where the publication is an item listing, the additional detail for the publication may include information comprising one or more of an item condition, a pattern, a product identification for the item, a brand, a style, a size, a seller identification, a color, an available quantity, a price (e.g., list price, sale price, or current auction price or bid), a number of items previously sold, and any other suitable information related to sale, purchase, or interaction with the item listing.

Figure 9:
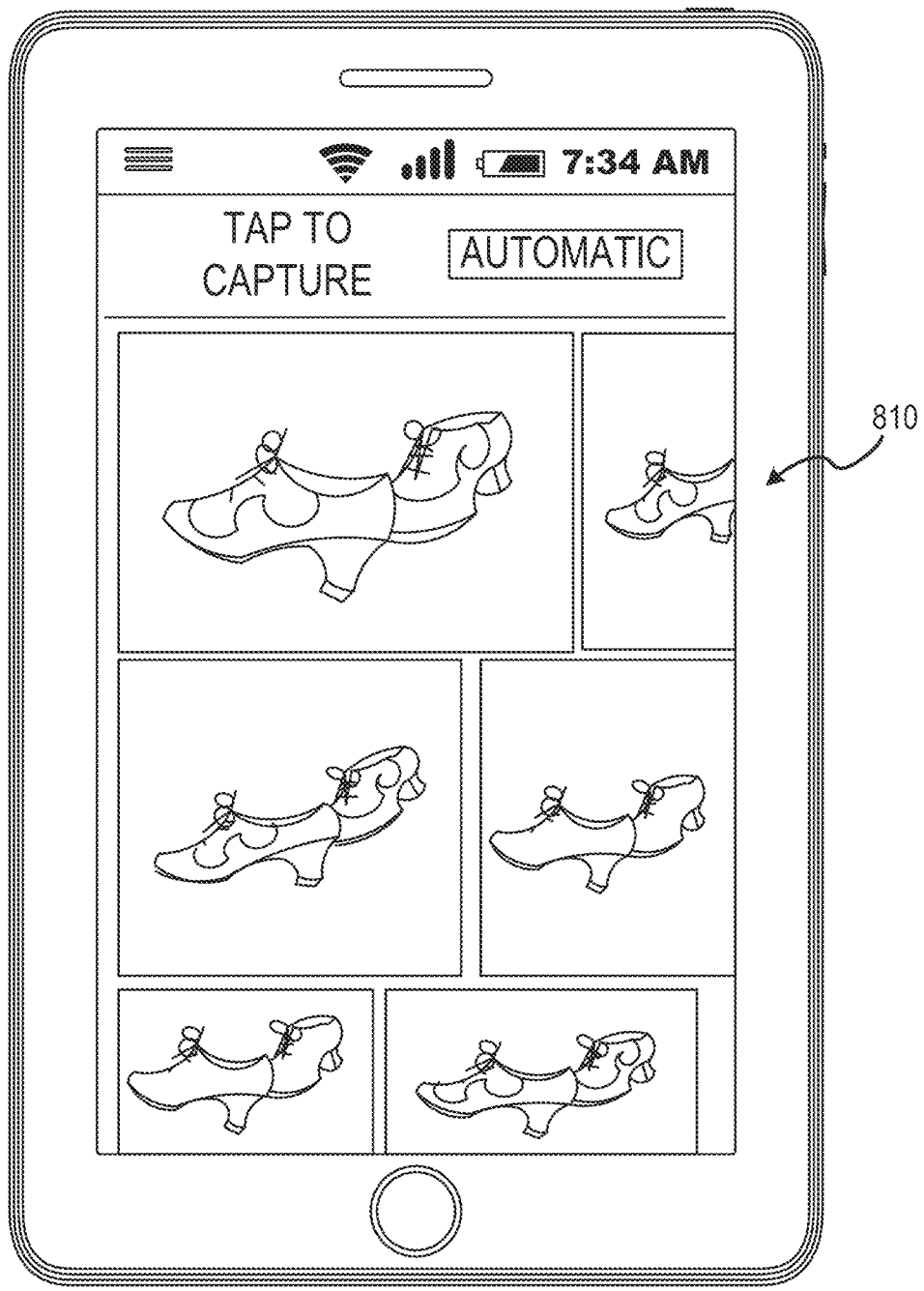
FIG. 9 is an example interface diagram illustrating a user interface screen of the intelligent assistant, according to some example embodiments.

In FIG. 8, in some example embodiments, the ranked list of publications is presented based on a representative image 830 for the publication. The representative images may be presented in a manner indicating the respective ranks of the publications included in the ranked list. For example, the images may be presented in a linear format with publications having a higher ranks being presented closer to a first position in the list (e.g., a topmost position or a leftmost position). In some instances, as shown in FIG. 9, the representative images 910 are presented in a tiled format. The tiled format may be representative of the rank of each publication. For example, the relative location of the image, the size of the image, a highlighting of the image, combinations thereof, or any other suitable presentation scheme may indicate a relative position of the publication within the ranked list. In these examples, the rank of the publication may be indicated by the size of the image (e.g., larger images associated with higher ranked publications), a relative location of the image (e.g., images positioned higher or otherwise more prominently are associated with higher ranked publications), or a highlighting of the image (e.g., images surrounded by a band or having a specified color coding are associated with higher ranked publications).

Figure 10:
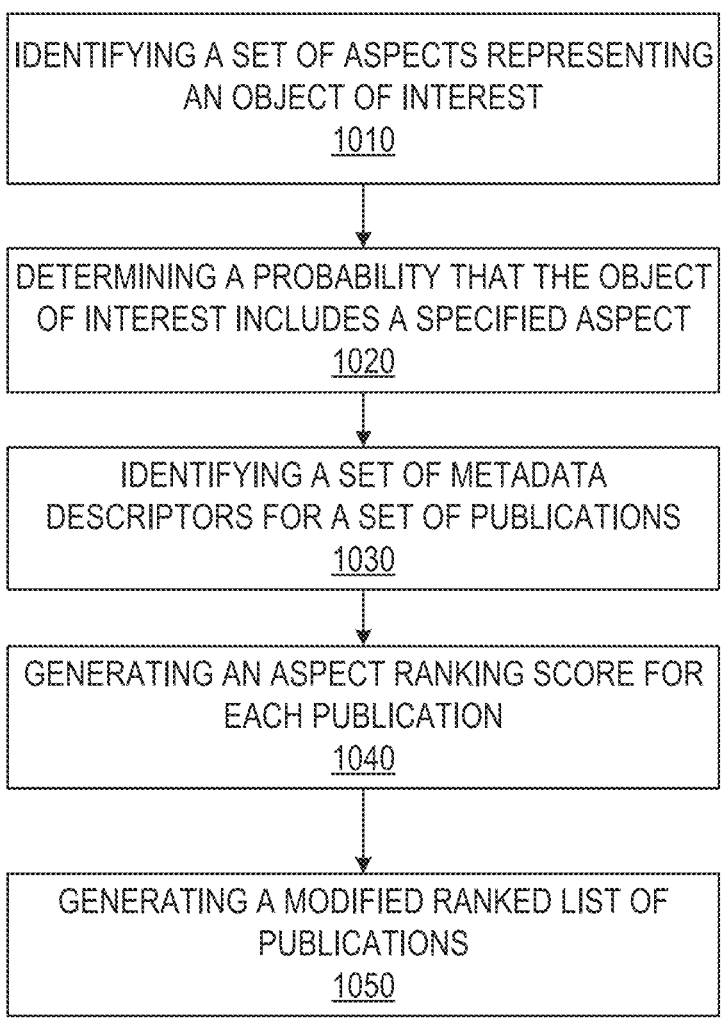
FIG. 10 is flowchart of a method for identifying a set of images based on image recognition, image signatures, and category prediction, according to some example embodiments.

FIG. 10 is a flowchart of operations of the computer vision component 208 in performing a method 1000 of identifying a set of images based on image recognition, image signatures, category prediction, and aspect prediction, according to some example embodiments. While the various operations in this flowchart are presented and described sequentially, one of ordinary skill will appreciate that some or all of the operations may be executed in a different order, be combined or omitted, or be executed in parallel. Operations in the method 1000 may be performed by the computer vision component 208, using components described above with respect to FIG. 6. In some embodiments, operations of the method 1000 are performed by or in conjunction with components of the computer vision component 208 and components of the artificial intelligence framework 144. In some embodiments, operations of the method 1000 form part or sub-operations of the method 1000. In some instances, one or more operations of the method 1000 are performed as part of or sub-operations of one or more operations of the method 1000.

In operation 1010, the image interpretation component 620 identifies a set of aspects representing one or more attributes of the object of interest within the at least one image. In some embodiments, the one or more attributes of the object of interest are elements of an appearance of the object of interest. In these embodiments, each aspect is a descriptive word associated with a specified attribute. In some embodiments, the set of aspects are determined by the image interpretation component 620 using one or more of edge detection, object recognition, color recognition, pattern recognition, and other suitable computer vision processes. For example, the image interpretation component 620 may use a computer vision process to identify a color (e.g., red), a pattern (e.g., floral), and an object type (e.g., dress) for the object of interest in the at least one image. The descriptive term, or a representation thereof, for the color, pattern, and object type may be included in the set of aspects. In some instances, the set of aspects are determined in a manner similar to or the same as described above with respect to operation 720.

In operation 1020, for each aspect of the set of aspects, the image interpretation component 620 determines a probability that the object of interest, within the at least one image, includes a specified aspect. Using the probability determined for each aspect, the image interpretation component 620 generates a confidence score for each aspect. Probabilities for each aspect of the set of aspects may be determined based on a matching portion (e.g., a percentage of the image signature which matches a publication signature or a position of a set of bits in the image signature matching a set of bits of the publication signature) of the image signature of the at least one image. In some instances, probabilities for each aspect are determined based on a similarity score generated using one or more of the image signature, metadata for the at least one image, a publication image signature, and metadata associated with the publication. The probabilities may also be determined similarly to or the same as described above with respect to operation 720.

In operation 1030, for each publication of the set of publications, the aspect ranking component 640 identifies a set of metadata descriptors. The metadata descriptors are implicit or explicit descriptive terms in or associated with the each publication of the set of publications. In some example embodiments, the metadata descriptors for a publication are author provided terms. In these examples, the party or entity (e.g., author, creator, administrator, or seller) responsible for or associated with a publication generates or otherwise provides the metadata descriptors for the publication during or after creation of the publication. For example, where the publication is an item listing for an electronic commerce system or website, a seller may include category designations, item description information (e.g., brand, color, pattern, product, style, size, or condition designations), or other descriptive words, phrases, or user interface selections to describe the item represented by the item listing. The metadata descriptors may be explicit, such that the terms comprising the set of metadata descriptors are viewable by users interacting with the publication. The metadata descriptors may also be implicit, such that the terms are associated with the publication but not presented within a presentation of the publication. For example, implicit metadata descriptors may be included in a metadata file associated with the publication or a metadata section included within the publication on a publication system.

In operation 1040, the aspect ranking component 640 generates an aspect rankings score for each publication of the set of publications. The aspect ranking score is generated by performing a weighted comparison of the set of aspects of the object of interest and the set of metadata descriptors. In some embodiments, each metadata descriptor for each publication is assigned a value. The set of aspects identified for the at least one image are compared to the metadata descriptors for each publication of the set of publications. For each aspect of the set of aspects which matches a metadata descriptor, the aspect ranking component 640 retrieves the value assigned to the metadata descriptor. Each publication may then be assigned the aspect ranking score as a combination of the values for each metadata descriptor matched to an aspect. In some embodiments, the aspect ranking component 640 adds the values for each matched metadata descriptor, and assigns the sum as the aspect rank score for the publication. The aspect ranking component 640 may similarly generate and assign aspect rank scores for each publication of the set of publications. The aspect ranking component 640 may generate and assign the aspect rank scores in series or in parallel for the set of publications.

In some embodiments, for each publication of the set of publications, the aspect ranking component 640 retrieves and sums the values for the matched metadata descriptors. The aspect ranking component 640 identifies a total value for the set of metadata descriptors associated with the publication. The total value may be calculated by adding the value of each metadata descriptor within the set of metadata descriptors. In these embodiments, the aspect ranking component 640 divides the sum of values for the matched metadata descriptors by the total value for the metadata descriptors associated with the publication. A quotient resulting from the division of the sum of values by the total value is the aspect ranking score for the publication.

In embodiments where the aspect ranking score is generated by a weighted comparison, the aspect ranking component 640 retrieves the ranking score for each publication determined in operation 750. The ranking score acts as appearance scores generated by comparing the image signatures for the at least one image and a representative image of each publication. For each publication, the aspect ranking component 640 the aspect ranking score and the appearance score according to a weighting scheme to generate a combined score. In some embodiments, the ranking scheme comprises one or more predetermined weights for the aspect ranking score and the appearance score. The predetermined weights may include a first weight for the appearance score and a second weight for the aspect ranking score. The first weight may be greater than the second weight, such that the appearance score accounts for a comparatively greater portion of the combined score than the aspect ranking score.

In some embodiments, the weighting scheme comprises one or more dynamic weights. The dynamic weights may be generated using one or more machine learning operations. The machine learning operations may comprise supervised learning, unsupervised learning, reinforcement learning, a neural network, a deep neural network, a partially connected neural network, a fully connected neural network, or any other suitable machine learning process, operation, model, or algorithm. The machine learning operations may accesses user interaction data along with historical search and ranking information. The historical search and ranking information comprises images or image signatures used in a plurality of previous searches, the publications identified in the plurality of searches, and the respective rankings of the publications and the metadata descriptors and aspects used to generate the rankings. The user interaction data comprises indications of user selections received upon presentation of the publications to a specified user performing a search. The machine learning algorithm modifies the one or more dynamic weights based on a probability of user interaction given an image type used to search and the appearance scores and aspect ranking scores generated for the publications retrieved by the search.

In operation 1050, the aspect ranking component 640 generates a modified ranked list of publications organized according to a second rank order reflecting a combination of the aspect ranking scores and the ranks based on the image signature. In some embodiments, the aspect ranking component 640 generates the modified ranked list similarly to the manner described above with respect to operation 750. The aspect ranking component 640 may generate the modified ranked list by reordering the ranked list generated in operation 750 from a first order to a second order, according to the aspect ranking scores. In some example embodiments, the aspect ranking component 640 generates the modified ranked list according to the combined score, generated from a combination or a weighted combination of the appearance score and the aspect ranking score.

Figure 11:
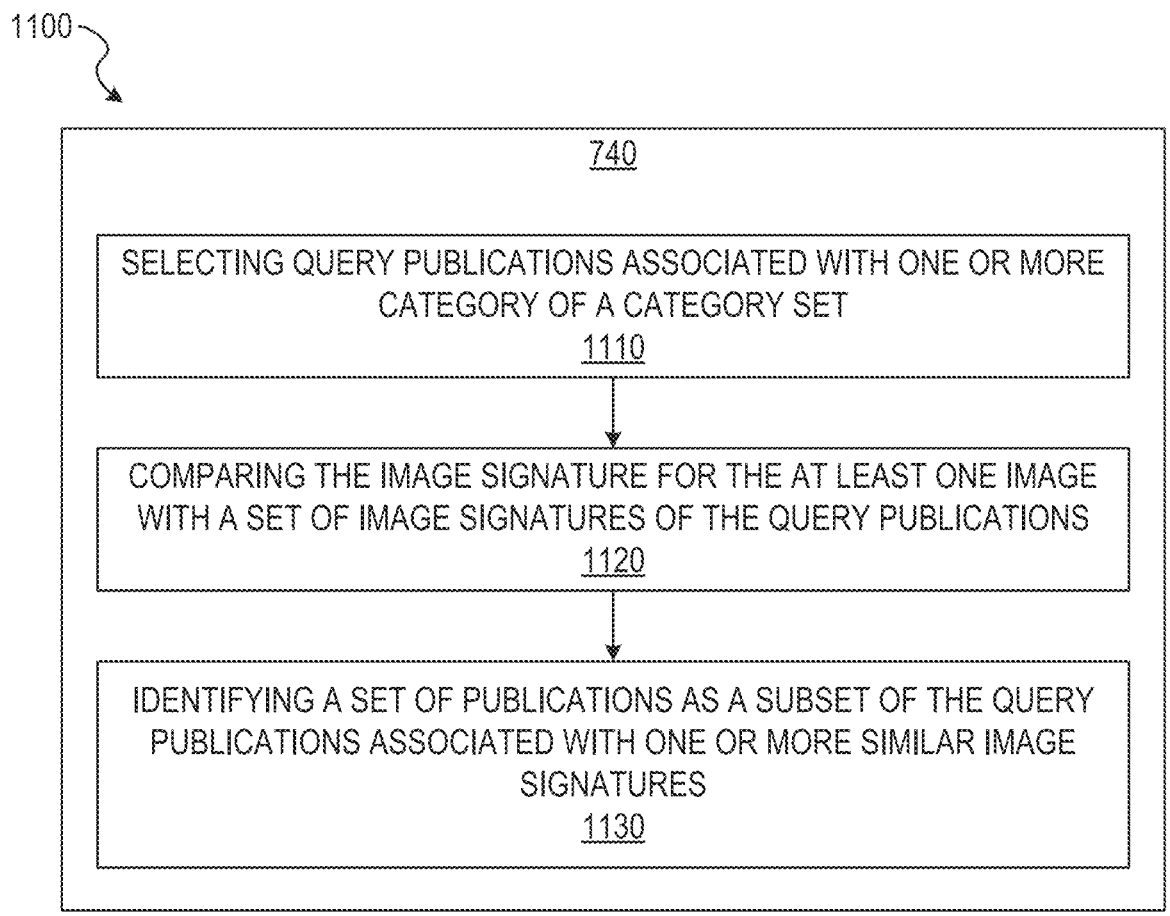
FIG. 11 is flowchart of a method for identifying a set of images based on image recognition, image signatures, and category prediction, according to some example embodiments.

FIG. 11 is a flowchart of operations of the computer vision component 208 in performing a method 1100 of identifying a set of images based on image recognition, image signatures and category prediction, according to some example embodiments. While the various operations in this flowchart are presented and described sequentially, one of ordinary skill will appreciate that some or all of the operations may be executed in a different order, be combined or omitted, or be executed in parallel. Operations in the method 1100 may be performed by the computer vision component 208, using components described above with respect to FIG. 6. In some embodiments, operations of the method 1100 are performed by or in conjunction with components of the computer vision component 208 and components of the artificial intelligence framework 144. In some embodiments, operations of the method 1100 form part or sub-operations of operation 740.

In operation 1110, the signature match component 630 selects query publications associated with one or more category of the category set. In some embodiments, the signature match component 630 may select the query publications by identifying data structures or clusters associated with the one or more category. In some instances, the signature match component 630 selects the query publications associated with the one or more category by performing an initial search of the publications to identify categories within the publications or contained in metadata associated with the publications. Where a publication includes, within the description or metadata of the publication, a category which matches one or more categories of the category set, the publication is selected for inclusion in the search.

In some example embodiments, the signature match component 630 is distributed across two or more search nodes. The search nodes access a publication database containing the total number of publications available for search. Each search node receives a request comprising at least one of the category set and the image signature for the at least one image. Each node is assigned to search a subset of the publications stored in the publication database. Upon receiving the request, each node determines whether the subset of publications assigned to the node is contained within at least one category of the category set. Where a portion of the subset of publications assigned to a node is contained within the at least one category, the node identifies an image signature for each publication of the subset of publications. The image signature for each publication may be associated with a representative image for the publication.

In operation 1120, the signature match component 630 compares the image signature for the at least one image with a set of image signatures associated with the query publications to determine one or more similar image signatures. The signature match component 630 may compare the image signature for the at least one image (e.g., the representative image or the representative image signature) of each publication within the query publications. In example embodiments where the signature match component 630 is distributed across two or more search nodes, each node of the signature match component 630 compares the image signature of the at least one image with the image signatures for the portion of the subset of publications assigned to the node and matching at least one category of the category set. The signature match component 630 may compare the image signatures similarly to or the same as the manner described above in operation 740.

In operation 1130, the signature match component 630 identifies the set of publications as a subset of the query publications associated with the one or more similar image signatures. In some embodiments, the signature match component 630 identifies publications with image signatures at least partially matching the image signature of the at least one image. The signature match component 630 assigns ranks to the publications in a manner similar to or the same as described with respect to operation 750. In some embodiments, the signature match component 630 selects publications for inclusion in the set of publications which have a ranking score (e.g., an appearance score) above a specified threshold. The specified threshold may be predetermined or dynamic. Where the threshold is dynamic, the threshold may be determined by one or more of a selection contained in the search request, a network traffic metric, a user preference, a ratio or proportion of the number of publications identified in operation 1120, combinations thereof, or any other suitable metric.

Figure 12:
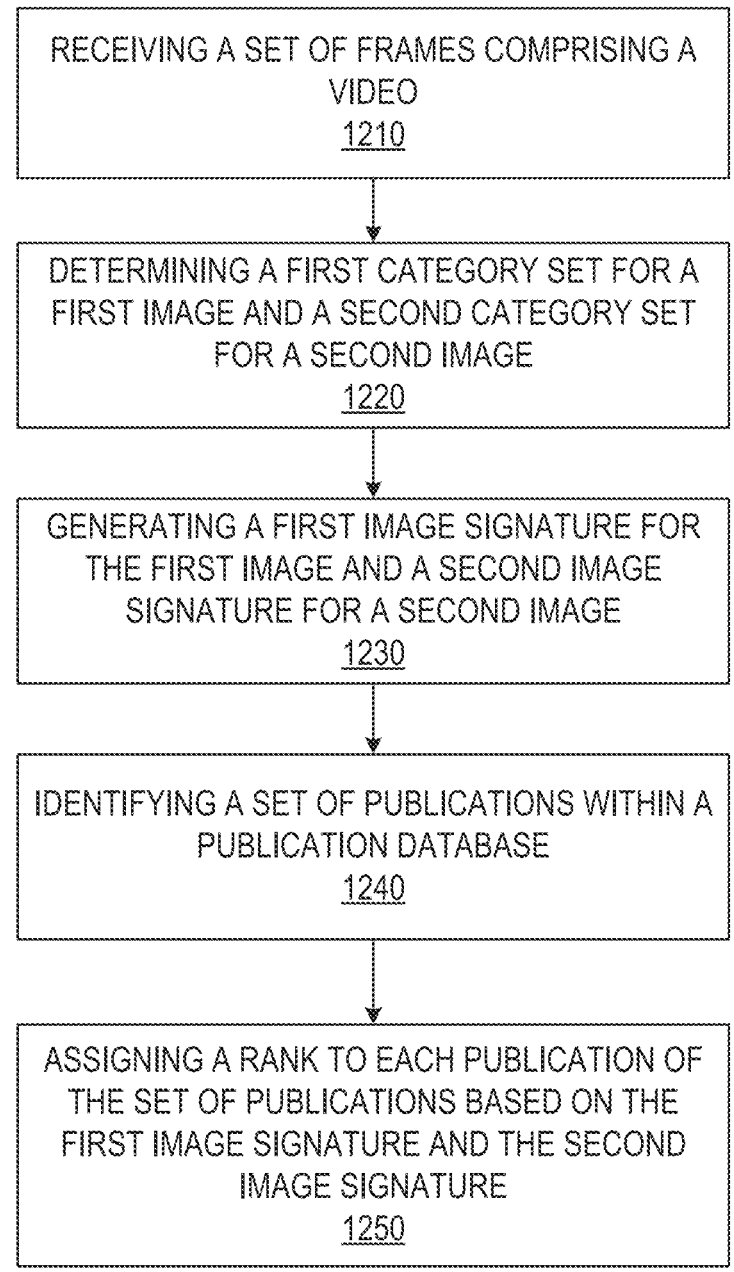
FIG. 12 is flowchart of a method for identifying a set of images based on image recognition, image signatures, and category prediction, according to some example embodiments.

FIG. 12 is a flowchart of operations of the computer vision component 208 in performing a method 1200 of identifying a set of images based on image recognition, image signatures and category prediction, according to some example embodiments. While the various operations in this flowchart are presented and described sequentially, one of ordinary skill will appreciate that some or all of the operations may be executed in a different order, be combined or omitted, or be executed in parallel. Operations in the method 1200 may be performed by the computer vision component 208, using components described above with respect to FIG. 6. In some embodiments, operations of the method 1200 are performed by or in conjunction with components of the computer vision component 208 and components of the artificial intelligence framework 144. In some embodiments, operations of the method 1200 form part of or sub-operations of the methods 700, 1000, or 1100.

In operation 1210, the image component 610 receives a set of frames comprising a video. The set of frames include at least one image. In some embodiments, the set of frames are received during capture of the set of frames by an image capture device. In these instances, the application associated with the image component 610, operating on the user device, causes an image capture device (e.g., a camera) to capture the set of frames and transmit the set of frames to the image component 610 in real time or near real time. For example, upon opening the application on the user device, the application may cause presentation of one or more user interface elements enabling access of the image capture device and initiation of one or more processes to capture the set of frames within the application. In some instances, the application includes a user interface element causing presentation of the set of frames as they are being captured, contemporaneous with the transmission of the set of frames to the image component 610. In some instances, a time delay exists between capture and presentation of the set of frames within the user interface of the application and transmission of the set of frames to the image component 610.

In some embodiments, the image component 610 receives a previously captured set of frames, such that the application associated with the image component 610 on the user device accesses the set of frames on a data storage device or terminates capture of the set of frames prior to transmission of the set of frames to the image component 610. For example, the application may provide one or more user interface elements enabling selection of a previously captured video from a camera roll on a smartphone (e.g., user device) or from a cloud service.

In operation 1220, the image interpretation component 620 determines a first category set for the object of interest in a first image and a second category set for the object of interest in a second image. The first image and the second image may be individual frames from the set of frames of the video. In some embodiments, the image interpretation component 620 determines the first category set and the second category set similarly to or the same as the manner described above in one or more of operation 720. Although described with reference to a first category set for a first image and a second category set for a second image, it should be understood that the image interpretation component 620 may determine any number of category sets for any number of images contained within the set of frames. For example, the image interpretation component 620 may determine a plurality of category sets for a plurality of images up to and including a total number of images of the set of images.

Although described with respect to a first category set and a second category set, where the image component 610 receives a set of images, the image interpretation component 620 determines a combination category set for a combination of the images comprising the set of frames. The image interpretation component 620 may generate a composite of two or more of the images comprising the set of frames. The composite may incorporate a plurality of the visual attributes, aspects, and characteristics of each image of the two or more images. The image interpretation component 620 may determine a composite category set from the composite image in a manner similarly to or the same as described above with respect to operation 720.

In operation 1230, the image interpretation component 620 generates a first image signature comprising a first vector representation of the first image and a second image signature comprising a second vector representation of the second image. In some embodiments, the image interpretation component 620 generates the first image signature for the first image and the second image signature for the second image in a manner similar to or the same as described above with respect to operation 730. In embodiments where the image interpretation component 620 generates the composite image from the two or more images of the set of frames, the image interpretation component 620 generates a composite image signature comprising a vector representation of the composite image. In some instances, the vector representation comprises a set of values which are floating point values between a first value (e.g., zero) and a second value (e.g., one). In some embodiments, the vector representation is a binary vector representation comprising a set of values which are either one or zero. In instances where the image interpretation component 620 identifies a combination category set for a combination of images of the set of frames, the image interpretation component 620 generates a combination image signature for the combination of images in the set of frames. In some example embodiments, the image interpretation component 620, identifying the combination category set, generates an image signature for each image of the combination of images in the set of frames, such that each image may be associated with an independent, and in some cases distinct, image signature.

In some embodiments, the image interpretation component 620 identifies a set of first aspects representing one or more attributes of the object of interest within the first image and a set of second aspects representing one or more attributes of the object of interest within the second image. Where the image interpretation component 620 generates a composite image, the image interpretation component 620 generates a composite set of aspects representing one or more attributes of the object of interest within the composite image. The image interpretation component 620 generates the set of first aspects, the set of second aspects, or the composite set of aspects in a manner similar to or the same as described with respect to operation 1010 (i.e., identifying the set of aspects) and operation 1020 (i.e., identifying probabilities for each aspect of the set of aspects).

In operation 1240, the signature match component 630 identifies the set of publications within the publication database. The signature match component 630 identifies the set of publications using the first category set, the second category set, the first image signature, and the second image signature. Where the image interpretation component 620 identifies the combination category set and the combination image signature, the signature match component 630 identifies the set of publications using the combination category set and the combination image signature for the combination of images in the set of frames. Where the image interpretation component 620 identifies the combination category set and separate image signatures for each image of the combination of images in the set of frames, the signature match component 630 identifies the set of publications using the combination category set and the separate image signatures for each image of the combination of images. In these instances, a set of publications is identified for each image signature, and as such, for each image of the combination of images. In embodiments where the image interpretation component 620 generates the composite image, identifies a composite category set, and determines a composite image signature, the signature match component 630 identifies the set of publications using the composite category set and the composite image signature. In one or more of the above-described embodiments, the signature match component 630 identifies the set of publications in a manner similar to or the same as described above with respect to operation 740 or operations 1110-1130.

In operation 1250, the signature match component 630 assigns a rank to each publication of the set of publications based on one or more of the first image signature and the second image signature. By assigning ranks to each publication, the signature match component 630 generates a ranked list of publications, where the ranked list includes at least a portion of the set of publications ordered according to the assigned ranks of the publications. Where the signature match component 630 identifies the set of publications for the combination category set and the combination image signature, the signature match component 630 assigns a rank to each publication based on the combination image signature. In instances where the signature match component 630 identifies the set of publications for the combination category and the separate image signatures for each image of the combination of images, the signature match component 630 assigns a rank to each publication based on the separate image signature used to identify the publication and the respective set of publications. In embodiments where the signature match component 630 identifies the set of publications using the composite category set and the composite image signature, the signature match component 630 assigns a rank to each publication of the set of publications using the composite image signature. In one or more of the above-referenced embodiments, the signature match component 630 assigns a rank to each publication in a manner similar to or the same as described above with respect to operation 750 or operation 1130.

In embodiments where the image interpretation component 620 identifies a set of aspects representing attributes of an image of the set of frames, the aspect ranking component 640 identifies a set of metadata descriptors for the each publication of the set of publications; generates an aspect ranking score for each publication; and generates a modified ranked list of publications according to a second rank order reflecting a combination of the aspect ranking scores and the ranks based on the image signature used, in part, to identify the set of publications. Where the image interpretation component 620 identifies a set of first aspects representing the first image and a set of second aspects representing the second image, the aspect ranking component 640 identifies a set of metadata descriptors for each publication of the set of publications identified for the first image and the second image; generates an aspect ranking score for each publication; and generates a modified ranked list of publications according to a second rank order reflecting a combination of the aspect ranking scores and the ranks based on the image signature used, in part, to identify the set of publications. In instances where the image interpretation component 620 identifies a composite set aspects representing the composite image, the aspect ranking component 640 identifies a set of metadata descriptors for each publication of the set of publications identified for the composite image; generates an aspect ranking score for each publication; and generates a modified ranked list of publications according to a second rank order reflecting a combination of the aspect ranking scores and the ranks based on the composite image signature. In one or more of the above-referenced embodiments or instances, the aspect ranking component 640 identifies the set of metadata descriptors in a manner similar to or the same as described above with respect to operation 1030; generates the aspect ranking scores in a manner similar to or the same as described above with respect to operation 1040; and generates the modified ranked list of publications in a manner similar to or the same as described with respect to operation 1050.

Example embodiments of the RSD approach discard proposals and directly solve the problem in the spatial domain. The number of parameters is reduced from billions to millions and achieves real-time speed. A rough saliency map is predicted, from which the exact number of boxes is inferred as the ground-truth objects based on the guidance of the subitizing output of the network. This unified framework addresses closely related problems, saliency map prediction, subitizing and salient object detection, without necessarily allocating separate resources for each.

Figure 13:
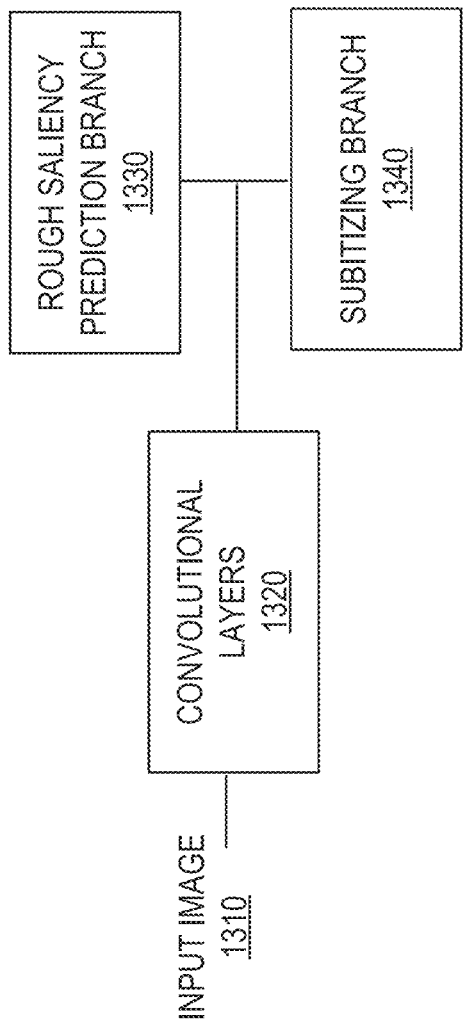
FIG. 13 is a block diagram illustrating an example of a software architecture that performs saliency-based object counting and localization that may be installed on a machine, according to some example embodiments.

The network includes the following components, shown in FIG. 13. An input image 1310 is accessed and processed by the convolutional layers 1320. The output of the convolutional layers 1320 is accessed by a rough saliency prediction branch 1330 and a subitizing branch 1340. The subitizing branch 1340 determines a salient object count of objects in the input image 1310. The salient object count is accessed by the rough saliency prediction branch 1330. The rough saliency prediction branch 1330 adds a heat map of probability distributions on the input image 1310 to indicate the locations of the salient objects in the input image 1310. The number of peaks of the probability distributions on the input image 1310 correspond to the salient object count. Then, the input image 1310 is accessed and modified with bounding polygons such as boxes to bound parts of the input image 1310 corresponding to the high probability regions of the heat map. In an example embodiment the bounding polygons are an indicator of the salient object count. In another example embodiment an integer is an indicator of the salient object count.

Figure 14:
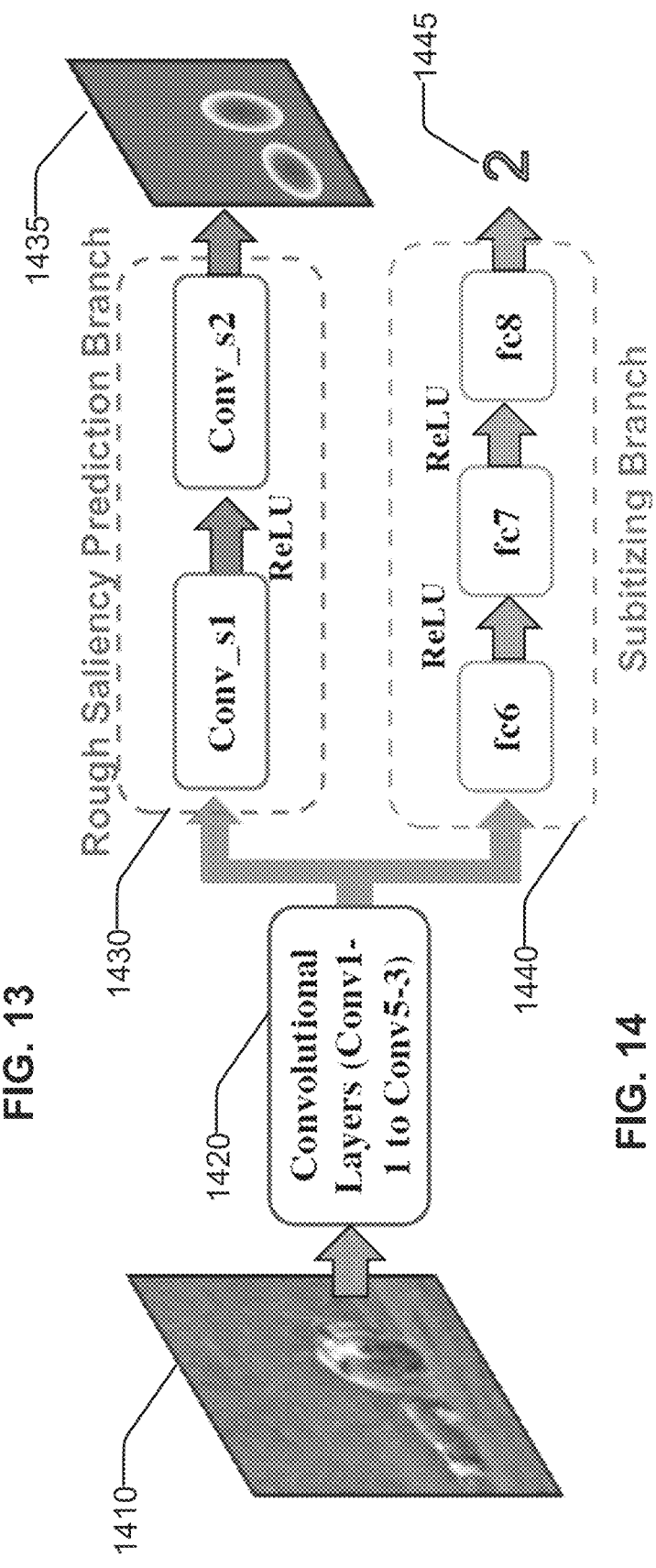
FIG. 14 is a more detailed example of the block diagram of FIG. 13 illustrating an example of a software architecture that performs saliency-based object counting and localization that may be installed on a machine, according to some example embodiments.

FIG. 14 shows an embodiment of FIG. 13. Images 1410 first go through a series of convolutional layers 1420 that can be any widely used models, such as VGG16 and ResNet-50, specifically the convolutional layers conv1 through conv5 3 from VGG16 and conv1 through res4f from ResNet-50. These layers capture low-level cues and high-level visual semantics. Two branches are connected to the feature maps from the last convolutional layer: saliency map prediction branch 1430 and subitizing branch 1440. The saliency map prediction branch 1430 consists of two convolutional layers, conv s1 and conv s2, to continue processing the image in the spatial domain and produce a rough saliency map 1435. The layer conv s1 has 80 3×3 filters to produce intermediate saliency maps conditioned on different latent distributions of the objects (e.g. latent object categories). For instance, each of the 80 filters can be seen as a way to generate a rough saliency map for a specific type of category. The layer conv s2 summarizes these conditional maps into a single saliency map by a 1×1 filter followed by a sigmoid function. The subitizing branch 1440 predicts the number of salient objects 1445 that can be 0, 1, 2, or 3+. It contains the final fc layers for VGG16, and all the remaining convolutional layers followed by a global average pooling layer and a single fc layer for ResNet-50. The prediction of the number of salient objects 1445 is accessed by the saliency map prediction branch 1430 to make the rough saliency map 1435.

The ground-truth for salient object detection only contains a set of numbers defining coordinates of bounding boxes tightly enclosing the objects. Although a binary mask can be generated based on these coordinates, i.e., 1 inside the bounding boxes and 0 elsewhere, such a binary mask does not separate overlapping objects or encode non-rigid boundaries.

To address this problem, Gaussian distributions are generated to represent salient objects, and images with Gaussian distributions are used as ground-truth saliency maps. Given a ground-truth bounding box Bi for an image with width W and height H, (cxi, cyi, wi, hi) represent the coordinates of its center, width, and height. If the network has the stride of s at the beginning of the saliency map prediction branch (e.g., 16 for VGG16), the ground-truth saliency map Mg is an image of size $\lfloor W/s \rfloor \times \lfloor H/s \rfloor$, where $\lfloor \cdot \rfloor$ is the floor function. Its (x, y)-th element is then defined as equation (1) in FIG. 15.

where $v_{xy}=[x, y]^T$ is the location vector, and $\mu_i=[\lfloor cx_i/s \rfloor, \lfloor cy_i/s \rfloor]^T$ is the mean value. N is the number of ground-truth bounding boxes in the image. $R_{Bi}$ represents the ROI inside bounding box $B_i$. The covariance matrix $\Sigma_i$ can be represented as equation (2) in FIG. 16.

Figure 17:
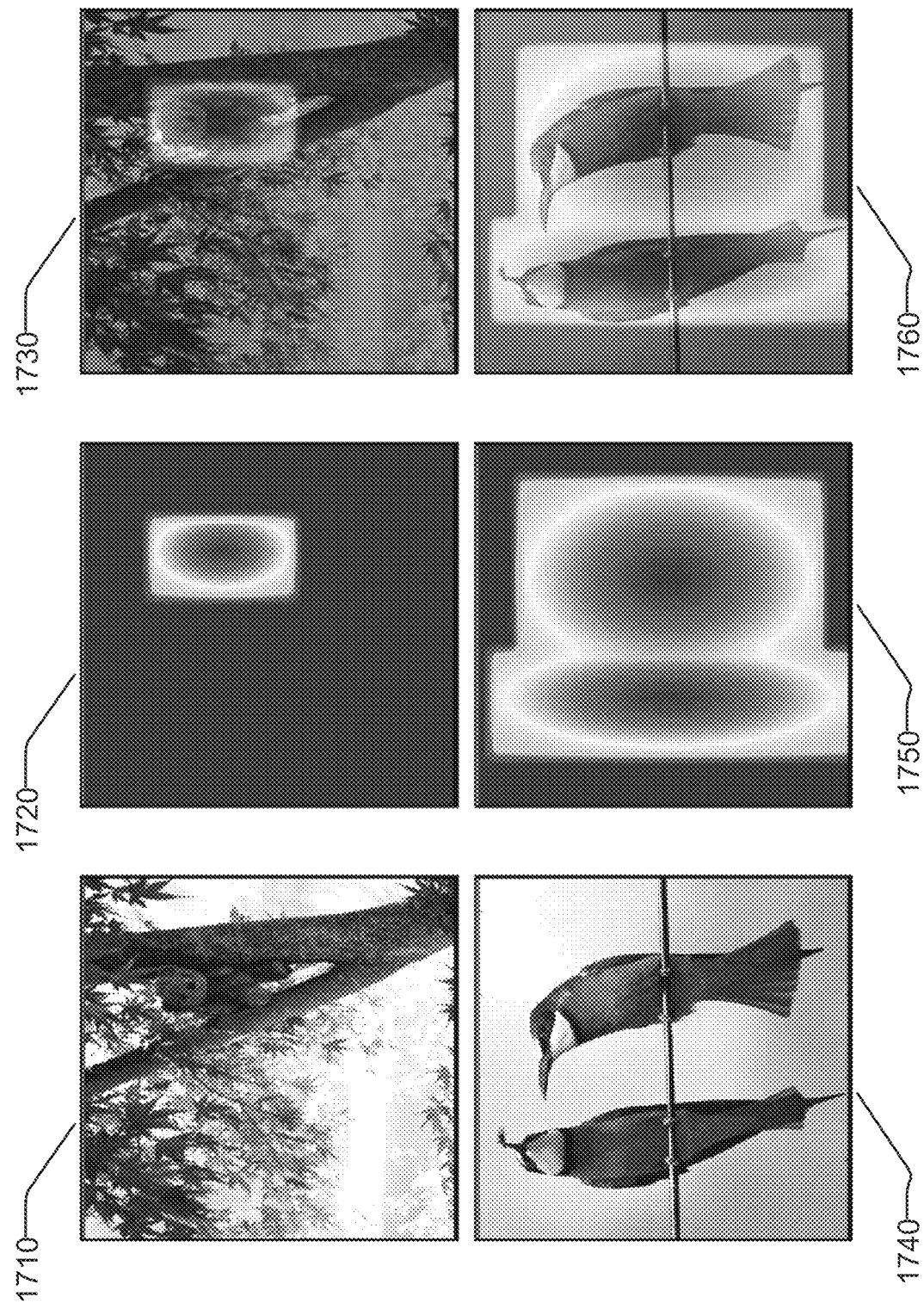
FIG. 17 is an example of generating ground-truth from training images, where each rectangular salient object is converted to a Gaussian distribution.

By equation (1), each bounding box is represented as a normalized 2D Gaussian distribution, located at the center of the bounding box, with the co-variance determined by the bounding box's height and width and truncated at the box boundary. As shown in FIG. 17 with images 1710, 1720, 1730, 1740, 1750, and 1760, the Gaussian shape ground-truth provides better separation for multiple objects compared to rectangular bounding boxes. It also naturally acts as spatial weighting to the ground-truth, so that the network learns to focus more on the center of objects instead of being distracted by background. Images 1710 and 1740 are input images. Images 1720 and 1750 are the Gaussian shape ground-truth. Images 1730 and 1760 overlay the input images and the Gaussian shape ground-truth.

The network predicts a saliency map from an image and performs subitizing as well. During training, the network tries to minimize the difference between the ground-truth map and the predicted saliency map. Although Euclidean loss is widely used to measure the pixel-wise distance, it pushes gradients towards 0 if the values of most pixels are 0, which is the case in our application when there are images with no salient object. Therefore, we use a weighted Euclidean loss to better handle this scenario, defined as Equation (3) of FIG. 18.

where $x \in \mathbb{R}^d$ and $g \in \mathbb{R}^d$ are the vectorized predicted and ground-truth saliency maps, respectively. $x_i$ and $g_i$ represent the corresponding i-th element. $\alpha$ is a constant weight set to 5 in all our experiments. Essentially, the loss $\ell_{sal}$ assigns more weight to the pixels with the ground-truth value higher than 0.5, compared to those with the value close to 0. In this way, the problem of gradient vanishing is alleviated since the loss focuses more on pixels belonging to the real salient objects and is not dominated by background pixels. As a classifier, the subitizing branch minimizes the multinomial logistic loss $\ell_{sub}(y, n)$ between the ground-truth number of objects n, and the predicted number of objects y. The two losses are combined as our final multi-task loss of Equation (4) of FIG. 19 where $\lambda$ is a weighting factor to balance the importance of the two losses. We set $\lambda=0.25$ to make the magnitude of the loss values comparable.

The loss in Equation (4) defines a multi-task learning problem. It reduces required resources by sharing weights between different tasks, and acts as a regularization to avoid over-fitting. SGD with momentum and weight decay is used to learn the parameters of the network.

A two-stage training scheme is adopted. The first stage initializes the network using the weights trained on ImageNet for classification and fine-tunes it on the ILSVRC2014 detection dataset by treating all objects as salient. In the second stage, we continue fine-tuning the network on the SOS dataset for salient object subitizing and detection. Although all the images in SOS are annotated for subitizing, some are not labeled for detection. Therefore, back-propagate gradients do not back-propagate to the saliency map prediction branch for these images labeled as containing salient objects but without bounding box annotations.

The loss function fine-tunes on the SOS dataset is defined by Equation (5) of FIG. 20 where $n_{box}$ indicates the number of bounding box annotations in the image.

The output of subitizing branch $n_{sub}$ tackles the existence sub-problem: determining whether an image contains any salient objects. If $n_{sub}=0$, any bounding boxes are not generated as there is no salient object; otherwise, algorithms generate single and multiple bounding boxes.

If $n_{sub}=1$ and the confidence of subitizing branch c is larger than a pre-defined threshold $\theta_c$, only a single object is indicated. The saliency map M is converted to a binary map $M_b$ using $\theta_c$, and then contour detection is performed using the fast Teh-Chin chain approximation on $M_b$ to detect connected components C and infer bounding boxes B. The ROI of box $B_i$ on the original map is defined as $M_{RBi}$, from which the maximal value is assigned as its score $S_{Bi}$. The one with the highest score is selected as the salient object. The entire process is summarized in Algorithm 1.

| Algorithm 1 Single bounding box generation |
|---|
| Parameters: $\theta_c \leftarrow$ Fixed confidence threshold |
| 1:   procedure SINGLEDETECT(M) |
| 2:     $M_b \leftarrow$ threshold(M, $\theta_c$) |
| 3:     C $\leftarrow$ detectContours($M_b$) |
| 4:     B $\leftarrow$ generateBoxes(C) |
| 5:     for $B_i \in$ B do |
| 6:       RBi $\leftarrow$ ROI of box Bi |
| 7:       SBi $\leftarrow$ maxMRBi |
| 8:     end for |
| 9:     return B = $\arg_{Bi} \max S_{Bi}$ |
| 10:  end procedure |

If $n_{sub}>1$, there may be multiple salient objects. In the case that the confidence $c<\theta_c$, $C_{MAX}$ peaks are sought on the saliency map M, where $C_{MAX}$ is the maximal subitizing label. Otherwise, at least nsub peaks are sought. A multi-level thresholding scheme has robust peak detection. Starting from a high threshold, a peak $Pi=[x_i, y_i]^T$ is discovered from M following similar steps in Algorithm 1. Peaks are continuously identified and added to the set of peaks P by reducing the threshold and repeating the process until the cardinality of P reaches or exceeds $n_{sub}$ (or $C_{MAX}$).

After the initial set of peaks are determined, peaks with low confidence are treated as noise and removed. Then separating lines L are sought to isolate remaining peaks into different non-overlapping regions. Each line perpendicular to the line segment connecting a pair of peaks is associated with a score. The score is the maximal value of the pixels this line passes on M. The one with the minimal score is selected as the separating line of the two peaks. This ensures that the seperating line passes through the boundaries between objects rather than the objects themselves.

These lines L divide M into different regions. Finally, for each peak $P_i \in P$, Algorithm 1 is applied to its corresponding region on the saliency map to obtain a bounding box. Algorithm 2 summarizes the process.

| Algorithm 2 Multiple bounding box generation |
|---|
| Parameters: |
| $\Theta \leftarrow$ Fixed thresholds for peak detection |
| $\theta_c \leftarrow$ Fixed confidence threshold |
| 1:   procedure MULTIDETECT(M) |
| 2:     P $\leftarrow \emptyset$, B $\leftarrow \emptyset$ |
| 3:     while $|P| \leq n_{obj}$ do |
| 4:       for $\theta_i \in \Theta$ do |
| 5:         $M_b \leftarrow$ threshold(M, $\theta_i$) |
| 6:         C $\leftarrow$ detectContours($M_b$) |
| 7:         for $C_j \in$ C do |
| 8:           P $\leftarrow$ P $\cup$ arg max $M_{Cj}$ |
| 9:         end for |
| 10:       end for |
| 11:     end while |
| 12:     P $\leftarrow$ P \ $P_i$ where $M(Pi) < \theta_c$, $\forall i$ |
| 13:     L $\leftarrow$ findSeparatingLines ($P_i$, $P_j$), $\forall i \neq j$ |
| 14:     for $P_i \in$ P do |
| 15:       $R_{Pi} \leftarrow$ ROI formed by L containing $P_i$ |
| 16:       B $\leftarrow$ B $\cup$ SINGLEDETECT($M_{RPi}$) |
| 17:     end for |
| 18:     return B |
| 19:  end procedure |

Salient object detection method is evaluated on three datasets, MSO, MSRA and DUT-O. The MSO dataset is the test set of the SOS dataset annotated for salient object detection. It contains images of multiple salient objects and many background images with no salient object. The performance of the method is evaluated for subitizing on this dataset. The MSRA and DUT-O datasets only contain images of a single salient object. For every image in the MSRA and DUT-O datasets, five raw bounding box annotations are provided, which are later converted to one ground-truth. The SOS dataset is used for training and others for evaluation. To verify that the RSD can also generate accurate pixel-wise saliency map, the method is evaluated on ESSD and PASCAL-S datasets.

In Algorithms 1 and 2, $\theta_c$=0.7 as the strong evidence threshold, $\Theta$=[0.95, 0.9, 0.8, 0.6] as the peak detection thresholds, and vertical and horizontal lines used as separating lines. The real-time network based on VGG16 uses an image size of 224×224 and the network based on ResNet-50 uses 448×448. Predicted saliency maps are smoothed by a Gaussian filter before converting them to binary maps. A Gaussian kernel is used with standard deviation of 10 for 448×448 input and 2 for 224×224 input. In the first training step, Xavier initialization is used for conv s1 and conv s2 and Gaussian initializer for the final fc layer in the subitizing branch. Fine-tuning on SOS uses a momentum of 0.9, weight decay of 5e-4, and learning rates of 1e-4 and 1e-5 for the VGG16 and ResNet-50 based methods, respectively. All timings are measured on an NVIDIA Titan X Pascal GPU, and a system with 128 GB RAM and Intel Core i7 6850K CPU.

The RSD generates the exact number of bounding boxes as salient objects, unlike other methods (SalCNN with MAP, SalCNN with Non-Maximum Suppression (SalCNN+NMS), SalCNN with Maximum Marginal Relevance (MMR), and MultiBox with NMS) with free parameters to determine the number of selected bounding boxes from hundreds of proposals. On the MSO dataset that contains multiple salient objects, the RSD-ResNet model produces the best result at the same precision or recall rate. RSD-VGG achieves almost the same precision/recall as the state-of-the-art methods while being more than 11× faster. On the MSRA and DUT-O datasets that contain single salient object in an image, both of the RSD-VGG and RSD-ResNet outperform the state-of-the-arts by a large margin. Notably, the RSDResNet achieves nearly 15% and 10% absolute improvement in precision at the same recall rate on the MSRA and DUT-O datasets, respectively, which clearly indicates that the method, without any object proposals, is more powerful and robust even when it is allowed to generate only a single bounding box.

The subitizing performance of the RSD is evaluated on the MSO dataset. The RSD with state-of-the-art methods is comparted in terms of solving the existence problem. While the parameters are fixed, the parameters of other methods are varied on different datasets to match their performance. For example, the parameters of other methods are tuned when comparing with the RSD-ResNet to achieve the same recall. Then the number of false positives in the background images is compared. The same thing is done with the RSD-VGG as well.

For predicting existence, both the RSD-ResNet and RSD-VGG produce fewer false positives when there is no salient object. Additionally, the counting performance of RSD is compared with two baselines using vanilla ResNet-50 and VGG16. For fair comparison, the same training scheme and initialization are used for all networks. The RSD method successfully produces better accuracy compared with vanilla ResNet-50 and VGG16, verifying that the multi-task training facilitates the subitizing branch to learn a better classifier by utilizing the information from saliency map prediction.

Even though any pixel-level annotations for salient foreground segmentation is not used, the RSD still generates accurate saliency map that aligns well with multiple salient objects in the scene. The RSD is compared against five unsupervised state-of-the-art salient object segmentation algorithms, including RC, SF, DSR, GMR and HS, and three fixation prediction algorithms, including PCAS, FT and GBVS. The performance is evaluated using precision-recall curves. Specifically, the precision and recall are computed by binarizing the grayscale saliency map using varying thresholds and comparing the binary mask against the ground-truth.

Example embodiments of the RSD approach are surprisingly good compared to other methods considering that they only use rough Gaussian maps as ground-truth. In particular, example embodiments of the RSD-ResNet approach even produce the best results in terms of precision/recall, being readily applicable for salient foreground segmentation without resort to any pixel-level annotations.

An ablation study is performed. Regarding localization, although proposals and pruning stage are not used like NMS, the straightforward bounding box generation algorithm generates good results. Moreover, bounding boxes generated by the method align with the ground-truth better compared to existing approaches, leading to the best precision and recall. In this experiment, other methods pick their parameters to get the same recall at IoU=0.5, and then the IoU threshold changed to evaluate the performance change. Notably, if the method has a more strict IoU criteria, such as 0.8, RSD still maintains a relatively high precision and recall, while the precision and recall of all the other methods greatly drop. At this IoU, even the fast RSD-VGG is able to outperform the state-of-the-art methods on all datasets by an average margin of around 10% in terms of both precision and recall. The results clearly demonstrate that the network successfully predicts an accurate saliency map and easily generates only a few bounding boxes tightly enclosing the correct salient objects. Example embodiments of the RSD approach clearly outperform Sal-CNN+MAP in generating better bounding boxes that more tightly enclose the ground-truth.

The behavior of detection methods usually differs when dealing with small and large objects. To better understand how the method works compared to existing methods, its performance is analyzed with respect to different sizes of objects. Objects with an area larger than 200×200 pixels are counted as large objects. For MSO and DUT-O datasets, the ground-truth boxes with an area less than 75×75 pixels are defined as small objects. This size is increased to 125×125 pixels for the MSRA dataset to obtain a statistically reliable subset for performance estimation since the salient objects in this dataset are generally larger. The precision and recall on small and large objects are evaluated separately using the same protocol as with salient object detection.

The RSD-ResNet clearly outperforms all the compared methods, achieving the best performance on the MSO dataset for both small and large objects. It also produces the best recall at the same precision for large objects on MSRA dataset and small objects on DUT-O dataset, indicating that it can discover objects of different sizes well under various conditions. At the same recall, the RSD-ResNet significantly improves the precision, especially for small objects that are usually difficult to locate by object proposal based approaches.

By directly generating saliency map through network forward without object proposals, example embodiments of the approach are extremely efficient for salient object detection during inference. The run-time speed of SalCNN and example embodiments of the approach are compared. With ResNet, example embodiments of the approach are able to achieve nearly 20 fps, while SalCNN only runs at 10 fps.

With VGG16, the method achieves an impressive speed at 120 fps, which is 12× faster than SalCNN, and readily applicable to real-time scenarios. This experiment confirms that the run-time speed of the network is successfully improved by removing the bottleneck of proposal generation and refinement.

Figure 21:
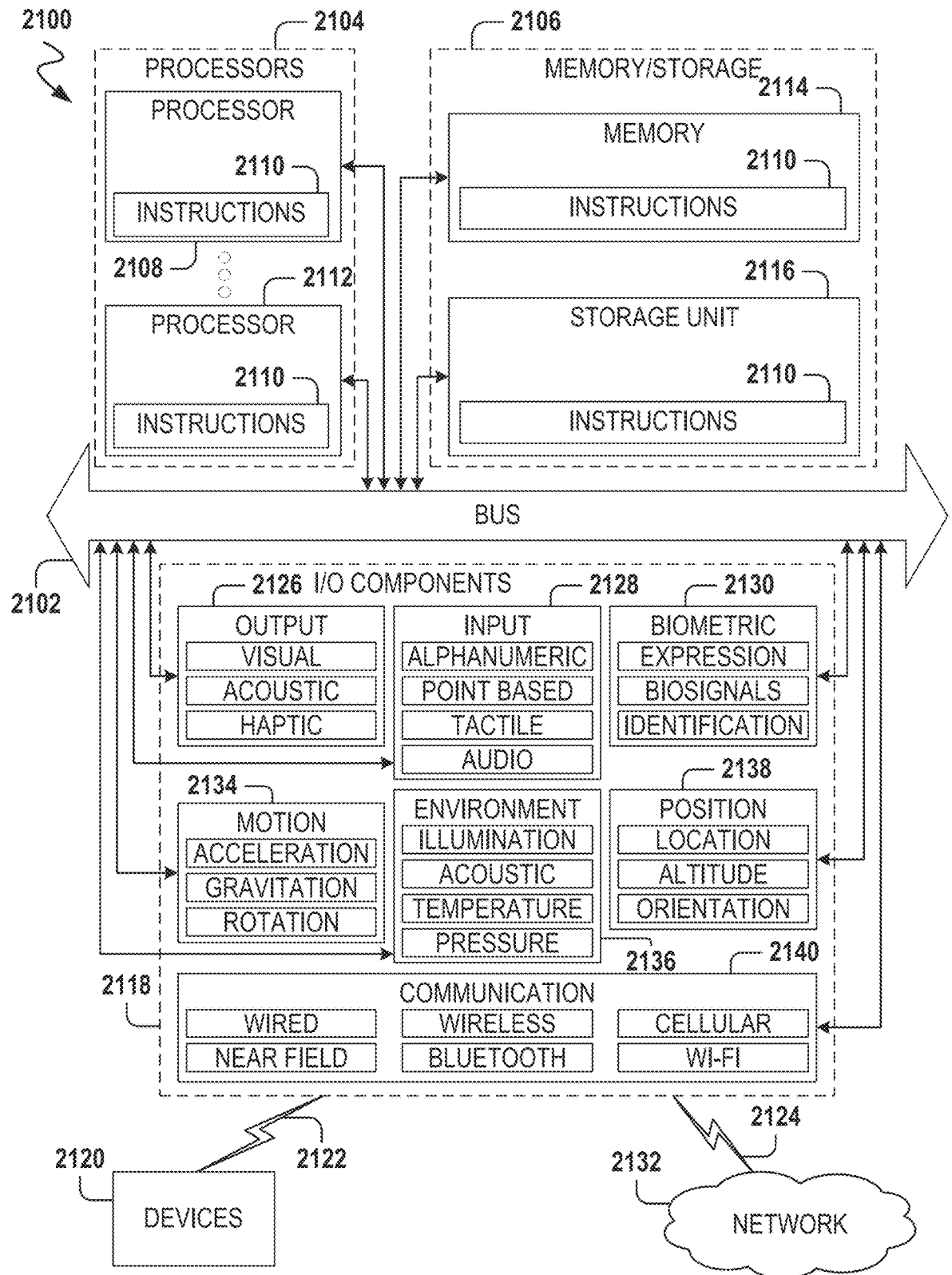
FIG. 21 is a block diagram illustrating an example of a software architecture that may be installed on a machine, according to some example embodiments.

A real-time unconstrained salient object detection framework uses deep convolutional neural networks, named RSD. By eliminating the steps of proposing and refining thousands of candidate boxes, the network learns to directly generate the exact number of salient objects. The network performs saliency map prediction without pixel-level annotations, salient object detection without object proposals, and salient object subitizing simultaneously, all in a single pass within a unified framework. Extensive experiments show that example embodiments of the RSD approach outperforms existing methods on various datasets for salient object detection, and produces comparable and better results for salient foreground segmentation. In particular, example embodiments of the approach based on VGG16 network achieves more than 100 fps on average on GPU during inference time, which is 12× faster than the state-of-the-arts, while being more accurate FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2110 (e.g., software, a program, an application, an applet, an app, or other executable code) for causing the machine 2100 to perform any one or more of the methodologies discussed herein may be executed. For example, the instructions 2110 may cause the machine 2100 to execute the example embodiments of FIGS. 2-20 and 22. Additionally, or alternatively, the instructions 2110 may implement the servers associated with the services and components of FIGS. 1-6, and so forth. The instructions 2110 transform the general, non-programmed machine 2100 into a particular machine 2100 programmed to carry out the described and illustrated functions in the manner described.

In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2110, sequentially or otherwise, that specify actions to be taken by the machine 2100. Further, while only a single machine 2100 is illustrated, the term "machine" shall also be taken to include a collection of machines 2100 that individually or jointly execute the instructions 2110 to perform any one or more of the methodologies discussed herein.

The machine 2100 may include processors 2104, memory/storage 2106, and I/O components 2118, which may be configured to communicate with each other such as via a bus 2102. In an example embodiment, the processors 2104 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2108 and a processor 2112 that may execute the instructions 2110. The term "processor" is intended to include multi-core processors that may comprise two or more independent processors (sometimes referred to as "cores") that may execute instructions contemporaneously. Although FIG. 21 shows multiple processors 2104, the machine 2100 may include a single processor with a single core, a single processor with multiple cores (e.g., a multi-core processor), multiple processors with a single core, multiple processors with multiples cores, or any combination thereof.

The memory/storage 2106 may include a memory 2114, such as a main memory, or other memory storage, and a storage unit 2116, both accessible to the processors 2104 such as via the bus 2102. The storage unit 2116 and memory 2114 store the instructions 2110 embodying any one or more of the methodologies or functions described herein. The instructions 2110 may also reside, completely or partially, within the memory 2114, within the storage unit 2116, within at least one of the processors 2104 (e.g., within the processor's cache memory), or any suitable combination thereof, during execution thereof by the machine 2100. Accordingly, the memory 2114, the storage unit 2116, and the memory of the processors 2104 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 2110. The term "machine-readable medium" shall also be taken to include any medium, or combination of multiple media, that is capable of storing instructions (e.g., instructions 2110) for execution by a machine (e.g., machine 2100), such that the instructions, when executed by one or more processors of the machine (e.g., processors 2104), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2118 may include a wide variety of components to receive input, provide output, produce output, transmit information, exchange information, capture measurements, and so on. The specific I/O components 2118 that are included in a particular machine will depend on the type of machine. For example, portable machines such as mobile phones will likely include a touch input device or other such input mechanisms, while a headless server machine will likely not include such a touch input device. It will be appreciated that the I/O components 2118 may include many other components that are not shown in FIG. 21. The I/O components 2118 are grouped according to functionality merely for simplifying the following discussion, and the grouping is in no way limiting. In various example embodiments, the I/O components 2118 may include output components 2126 and input components 2128. The output components 2126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 2118 may include biometric components 2130, motion components 2134, environmental components 2136, or position components 2138 among a wide array of other components. For example, the biometric components 2130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2134 may include acceleration sensor components (e.g., accelerometer), gravitation sensor components, rotation sensor components (e.g., gyroscope), and so forth. The environmental components 2136 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 2138 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2118 may include communication components 2140 operable to couple the machine 2100 to a network 2132 or devices 2120 via a coupling 2124 and a coupling 2122, respectively. For example, the communication components 2140 may include a network interface component or other suitable device to interface with the network 2132. In further examples, the communication components 2140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2120 may be another machine or any of a wide variety of peripheral devices (e.g., a peripheral device coupled via a USB).

Moreover, the communication components 2140 may detect identifiers or include components operable to detect identifiers. For example, the communication components 2140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2140, such as location via Internet Protocol (IP) geo-location, location via Wi-Fi® signal triangulation, location via detecting an NFC beacon signal that may indicate a particular location, and so forth.

In various example embodiments, one or more portions of the network 2132 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2132 or a portion of the network 2132 may include a wireless or cellular network and the coupling 2124 may be a Code Division Multiple Access (CDMA) connection, a Global System for Mobile communications (GSM) connection, or another type of cellular or wireless coupling. In this example, the coupling 2124 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2110 may be transmitted or received over the network 2132 using a transmission medium via a network interface device (e.g., a network interface component included in the communication components 2140) and utilizing any one of a number of well-known transfer protocols (e.g., hypertext transfer protocol (HTTP)). Similarly, the instructions 2110 may be transmitted or received using a transmission medium via the coupling 2122 (e.g., a peer-to-peer coupling) to the devices 2120. The term "transmission medium" shall be taken to include any intangible medium that is capable of storing, encoding, or carrying the instructions 2110 for execution by the machine 2100, and includes digital or analog communications signals or other intangible media to facilitate communication of such software.

Figure 22:
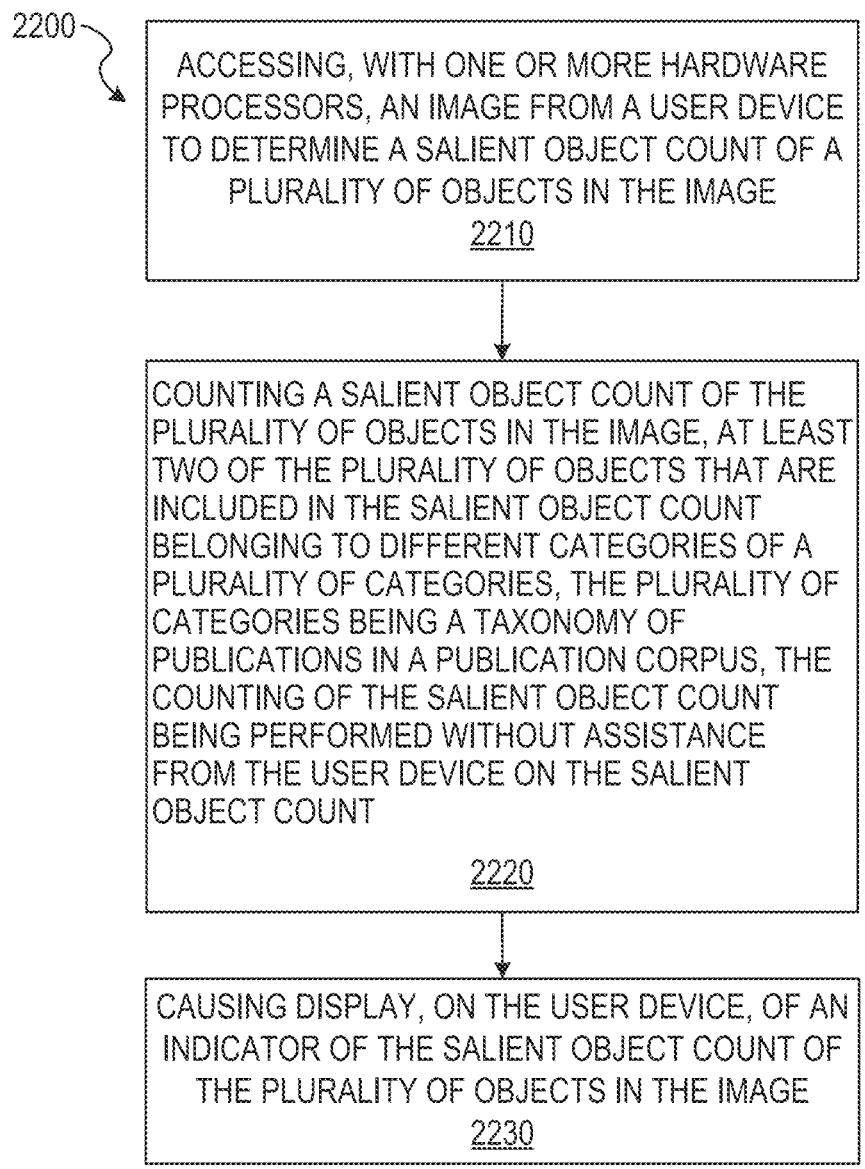
FIG. 22 is flowchart of a method performs saliency-based object counting and localization according to an example embodiment.

FIG. 22 is flowchart of a method 2200 that performs saliency-based object counting and localization according to an example embodiment.

Operation 2210 is accessing, with one or more processors, an image from a user device to determine a salient object count of a plurality of objects in the image.

Operation 2220 is counting a salient object count of the plurality of objects in the image, at least two of the plurality of objects that are included in the salient object count belonging to different categories of a plurality of categories, the plurality of categories being a taxonomy of publications in a publication corpus, the counting of the salient object count being performed without assistance from the user device on the salient object count.

Operation 2230 is causing display, on the user device, of an indicator of the salient object count of the plurality of objects in the image.

In various example embodiments, the method 2200 has additional operations such as performing visual search on the plurality of objects to identify the plurality of objects, performing background removal on the plurality of objects, generating a heat map with a probability distribution having a plurality of peak probability regions corresponding to the plurality of objects (the salient object count corresponding to a total of the plurality of peak probability regions), iteratively performing the accessing and the counting on a sequence of video frames, and adding a plurality of publications to a publication corpus, the plurality of publications corresponding to the plurality of objects.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A method, comprising:
generating, via hardware processing circuitry, a plurality of conditional maps for an image via applying a plurality of filters to the image, wherein each filter corresponds to a respective object category;
generating, via the hardware processing circuitry, a heat map for the image based at least in part on the plurality of conditional maps, the heat map depicting a plurality of probability regions indicating locations of one or more salient objects in the image;
determining, via the hardware processing circuitry, a count of a plurality of objects in the image, the count based on the plurality of probability regions exceeding a threshold confidence score; and
causing display, on a device, of an indication of the count of the plurality of objects.

2. The method of claim 1, wherein the plurality of probability regions are also determined based on a convolutional neural network.

3. The method of claim 1, wherein the count is determined by a neural network trained to count objects in images.

4. The method of claim 1, wherein at least one bounding box is applied to at least one of the plurality of probability regions.

5. The method of claim 1, wherein the plurality of probability regions comprise a plurality of peak probability regions.

6. The method of claim 5, wherein the determining of the count is based on the plurality of peak probability regions.

7. The method of claim 5, further comprising defining bounding polygons determining portions of the image corresponding to the plurality of peak probability regions, wherein the determining of the count is based on the bounding polygons.

8. The method of claim 5, further comprising counting a total number of the plurality of peak probability regions, wherein the count is based on the total number.

9. The method of claim 8, further comprising iteratively performing the determining of the count for a sequence of video frames.

10. The method of claim 1, wherein generating the plurality of conditional maps for the image comprises processing the image via a first convolutional layer comprising the plurality of filters, and wherein generating the heat map comprises summarizing the plurality of conditional maps via applying a second convolutional layer comprising a second filter.

11. A system comprising:
at least one processor; and
at least one memory including instructions which when executed by the at least one processor causes operations comprising:
generating a plurality of conditional maps for an image via applying a plurality of filters to the image, wherein each filter corresponds to a respective object category;

generating a heat map for the image based at least in part on the plurality of conditional maps, the heat map depicting a plurality of probability regions indicating locations of one or more salient objects in the image;

determining a count of a plurality of objects in the image, the count based on the plurality of probability regions exceeding a threshold confidence score; and causing display of an indication of the count of the plurality of objects.

12. The system of claim 11, wherein the plurality of probability regions are also determined based on a convolutional neural network.

13. The system of claim 11, wherein the count is determined by a neural network trained to count objects in images.

14. The system of claim 11, wherein at least one bounding box is applied to at least one of the plurality of probability regions based on the count.

15. The system of claim 11, wherein the plurality of probability regions comprise a plurality of peak probability regions.

16. The system of claim 15, wherein the determining of the count is based on the plurality of peak probability regions.

17. The system of claim 15, further comprising defining bounding polygons determining portions of the image corresponding to the plurality of peak probability regions, wherein the determining of the count is based on the bounding polygons.

18. A non-transitory computer-readable storage medium including program code which when executed by at least one processor causes operations comprising:

generating, via hardware processing circuitry, a plurality of conditional maps for an image via applying a plurality of filters to the image, wherein each filter corresponds to a respective object category;

generating a heat map for the image based at least in part on the plurality of conditional maps, the heat map depicting a plurality of probability regions indicating locations of one or more salient objects in the image;

determining a count of a plurality of objects in the image, the count based on the plurality of probability regions exceeding a threshold confidence score; and causing display of an indication of the count of the plurality of objects.

19. The non-transitory computer-readable storage medium of claim 18, wherein at least one bounding box is applied to at least one of the plurality of probability regions.

20. The non-transitory computer-readable storage medium of claim 18, wherein the plurality of probability regions comprise a plurality of peak probability regions and wherein the determining of the count is based on the plurality of peak probability regions.

* * * * *